United States Patent
Sharma et al.

(10) Patent No.: US 12,556,897 B2
(45) Date of Patent: Feb. 17, 2026

(54) ELECTRONIC APPARATUS AND CONTROLLING METHOD THEREOF

(71) Applicant: Samsung Electronics Co., Ltd., Suwon-si (KR)

(72) Inventors: Manoj Kumar Sharma, Suwon-si (KR); Hojeen Jee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 288 days.

(21) Appl. No.: 18/446,890

(22) Filed: Aug. 9, 2023

(65) Prior Publication Data
US 2024/0147206 A1    May 2, 2024

Related U.S. Application Data

(63) Continuation of application No. PCT/KR2023/009951, filed on Jul. 12, 2023.

(30) Foreign Application Priority Data

Nov. 1, 2022 (KR) .................. 10-2022-0143517

(51) Int. Cl.
*H04W 4/80* (2018.01)
(52) U.S. Cl.
CPC ..................... *H04W 4/80* (2018.02)
(58) Field of Classification Search
CPC ....... H04W 4/80; H04W 40/24; H04W 76/11; H04W 76/15; H04W 76/10; G06F 3/165
See application file for complete search history.

(56) References Cited

U.S. PATENT DOCUMENTS 9,973,839 B2 *   5/2018   Kim .................. H04W 52/0216
10,021,451 B2    7/2018   Lee et al.
(Continued)

FOREIGN PATENT DOCUMENTS

JP          7492995 B2    5/2024
KR   10-2011-0026938 A    3/2011
(Continued)

OTHER PUBLICATIONS

International Search Report dated Oct. 27, 2023 for PCT Application No. PCT/KR2023/009951.
(Continued)

*Primary Examiner* — Tuan H Nguyen
(74) *Attorney, Agent, or Firm* — Nixon & Vanderhye P.C.

(57) ABSTRACT

An electronic apparatus may include a memory configured to store a connection list including devices that can be connected with the electronic apparatus, a communication interface configured to broadcast an audio signal to a first audio apparatus and a second audio apparatus included in the connection list, and at least one processor which may be configured to, based on identifying a predetermined event wherein the audio signal is not output from the first audio apparatus, control the communication interface such that the electronic apparatus and the second audio apparatus included in the connection list are connected through low energy Bluetooth communication, based on the electronic apparatus and the second audio apparatus being connected, transmit a signal requesting output state information to the second audio apparatus, remove the second audio apparatus from the connection list based on the output state information corresponding to a non-output of the audio signal received from the second audio apparatus through the communication interface, and based on devices included in the
(Continued)

connection list not existing, control the communication interface to stop transmission of the audio signal.

15 Claims, 20 Drawing Sheets

(56) References Cited

U.S. PATENT DOCUMENTS

| | | | |
|---|---|---|---|
| 10,412,479 B2 | 9/2019 | Zhao et al. | |
| 12,413,660 B2 | 9/2025 | Liu et al. | |
| 2014/0348327 A1 | 11/2014 | Linde et al. | |
| 2017/0272851 A1 | 9/2017 | Kim et al. | |
| 2018/0225082 A1 | 8/2018 | An et al. | |
| 2020/0336786 A1 | 10/2020 | Lee et al. | |
| 2020/0379729 A1* | 12/2020 | Graham | H04M 1/72412 |
| 2022/0417645 A1 | 12/2022 | Choi et al. | |
| 2023/0273763 A1 | 8/2023 | Kim et al. | |
| 2024/0056720 A1 | 2/2024 | Jin et al. | |

FOREIGN PATENT DOCUMENTS

| | | |
|---|---|---|
| KR | 10-1820369 B1 | 1/2018 |
| KR | 20180029043 A | 3/2018 |
| KR | 10-2021-0100580 A | 8/2021 |
| KR | 10-2021-0116118 A | 9/2021 |
| KR | 10-2345616 B1 | 12/2021 |
| KR | 10-2022-0061537 A | 5/2022 |
| KR | 10-2022-0147243 A | 11/2022 |
| WO | WO 2020/005260 A1 | 1/2020 |
| WO | WO 2022-022722 A1 | 2/2022 |
| WO | WO 2022-158787 A1 | 7/2022 |

OTHER PUBLICATIONS

PCT Written Opinion dated Oct. 27, 2023 for PCT Application No. PCT/KR2023/009951.
Extended European Search Report dated Oct. 8, 2025 for EP Application No. 23885942.5.
Mukhtar H et al; XP031282567 "Session Mobility of Multimedia Applications in Home Networks Using UPnP"; Multitopic Conference, 2007. INMIC 2007 IEEE International, IEEE, Piscataway, NJ, USA; Dec. 28, 2007.

* cited by examiner

FIG. 4

| DEVICES THAT CAN BE CONNECTED | | | |
|---|---|---|---|
| CLASSIFICATION | NAME | NO. | TYPE |
| 1 | s-buds1 | #01 | HEADSET |
| 2 | s-buds2 | #02 | HEADSET |
| 3 | s-speaker | #03 | SPEAKER |
| 4 | s-remote | #04 | REMOTE CONTROL |

410

↓ CONNECTION WITH S-BUDS1 FAILED

| DEVICES THAT CAN BE CONNECTED | | | |
|---|---|---|---|
| CLASSIFICATION | NAME | NO. | TYPE |
| ~~1~~ | ~~s-buds1~~ | ~~#01~~ | ~~HEADSET~~ |
| 2 | s-buds2 | #02 | HEADSET |
| 3 | s-speaker | #03 | SPEAKER |
| 4 | s-remote | #04 | REMOTE CONTROL |

420

↓ S-BUDS2 IS NOT IN AN OUTPUTTING STATE

| DEVICES THAT CAN BE CONNECTED | | | |
|---|---|---|---|
| CLASSIFICATION | NAME | NO. | TYPE |
| ~~1~~ | ~~s-buds1~~ | ~~#01~~ | ~~HEADSET~~ |
| ~~2~~ | ~~s-buds2~~ | ~~#02~~ | ~~HEADSET~~ |
| 3 | s-speaker | #03 | SPEAKER |
| 4 | s-remote | #04 | REMOTE CONTROL |

430

ELECTRONIC APPARATUS AND CONTROLLING METHOD THEREOF

CROSS REFERENCE TO RELATED APPLICATION

This application is a continuation of International Application PCT/KR2023/009951, filed Jul. 12, 2023, which is based on and claims priority on KR Patent Application No. 10-2022-0143517 filed on Nov. 1, 2022, the disclosures of which are all hereby incorporated herein by reference in their entireties.

BACKGROUND

Field

Certain example embodiments relate to an electronic apparatus and/or a controlling method thereof, and for example, to an electronic apparatus that outputs an audio signal through an external apparatus by using Bluetooth communication, and/or a controlling method thereof.

Description of the Related Art

An electronic apparatus providing audio (e.g., a TV) may transmit a low energy (LE) audio signal to an external apparatus. The electronic apparatus may transmit an LE audio signal to an external apparatus according to a user control instruction on a specific time point.

To specify an external apparatus to transmit an LE audio signal, the electronic apparatus may search (or explore) an external apparatus to output an audio signal. A user may input a control instruction for outputting an audio signal at a specific external apparatus through the electronic apparatus or the external apparatus.

After an LE audio signal is transmitted, a time point of stopping transmission of an LE audio signal may become a problem. In case an LE audio signal is repeatedly transmitted even though an external apparatus to output an LE audio signal does not exist, there is a problem that the resource and the power are wasted.

SUMMARY

Certain example embodiments are for improving the aforementioned problem(s), for example in providing an electronic apparatus that determines a time point for stopping transmission of an audio signal through a connection list indicating devices that can be connected with, directly or indirectly, the electronic apparatus, and/or a controlling method thereof.

An electronic apparatus according to various example embodiments may include a memory configured to store a connection list including devices that can be connected with, directly or indirectly, the electronic apparatus, a communication interface configured to broadcast an audio signal to a first audio apparatus and a second audio apparatus included in the connection list, and at least one processor which may be configured to, based on the audio signal not being output from the first audio apparatus, control the communication interface such that the electronic apparatus and the second audio apparatus included in the connection list are connected through at least low energy Bluetooth communication, based on the electronic apparatus and the second audio apparatus being connected, transmit a signal requesting output state information to the second audio apparatus, remove the second audio apparatus from the connection list based on the output state information corresponding to a non-output of the audio signal received from the second audio apparatus through the communication interface, and based on devices included in the connection list not existing, control the communication interface to stop transmission of the audio signal.

The at least one processor may, based on receiving a user input for connecting with the first audio apparatus among the at least one apparatus included in the connection list, control the communication interface such that the electronic apparatus and the first audio apparatus are connected through at least low energy Bluetooth communication, and based on the electronic apparatus and the first audio apparatus being connected, directly or indirectly, transmit an audio signal to the first audio apparatus, and remove the first audio apparatus from the connection list.

The non-output of the audio signal may include at least one of reception of a user input for releasing connection with the first audio apparatus, identification of the first audio apparatus not outputting the audio signal, or non-reception of a response signal related to the connection from the first audio apparatus.

The at least one processor may, based on the electronic apparatus and the second audio apparatus not being connected, remove the second audio apparatus from the connection list, and identify the devices included in the connection list.

The at least one processor may, based on the audio signal being output from the second audio apparatus, remove the second audio apparatus from the connection list.

The at least one processor may, based on a predetermined event being identified, store connection information corresponding to the first audio apparatus in the memory.

The at least one processor may, based on the electronic apparatus and the second audio apparatus not being connected or the audio signal not being output from the second audio apparatus, remove the second audio apparatus from the connection list, and control the communication interface such that the electronic apparatus and the first audio apparatus are re-connected through at least low energy Bluetooth communication based on the connection information corresponding to the first audio apparatus.

The at least one processor may, based on the audio signal being output from the second audio apparatus, remove the second audio apparatus from the connection list, and delete the connection information corresponding to the first audio apparatus.

The electronic apparatus may further include a display, and the at least one processor may, based on devices included in the connection list not existing, control the display to display a guide screen corresponding to a mute function, and based on receiving a third user input for performing the mute function through the guide screen, perform the mute function.

The guide screen may include text information indicating that the audio signal was output through the electronic apparatus.

In certain example embodiments, there may be provided a controlling method of an electronic apparatus configured to store a connection list including devices that can be connected, directly or indirectly, and broadcast an audio signal to a first audio apparatus and a second audio apparatus included in the connection list according to various embodiments may include the steps of, based on the audio signal not being output from the first audio apparatus, connecting the electronic apparatus and the second audio apparatus included in the connection list through low energy Bluetooth communication, based on the electronic apparatus and the second audio apparatus being connected, transmitting a signal requesting output state information to the second audio apparatus, removing the second audio apparatus from the connection list based on the output state information corresponding to a non-output of the audio signal received from the second audio apparatus, and based on devices included in the connection list not existing, stopping transmission of the audio signal and outputting the audio signal.

The controlling method may further include the steps of, based on receiving a user input for connecting with the first audio apparatus among the at least one apparatus included in the connection list, connecting the electronic apparatus and the first audio apparatus through low energy Bluetooth communication, and based on the electronic apparatus and the first audio apparatus being connected, transmitting an audio signal to the first audio apparatus, and removing the first audio apparatus from the connection list.

The non-output of the audio signal may include at least one of reception of a user input for releasing connection with the first audio apparatus, identification of the first audio apparatus not outputting the audio signal, or non-reception of a response signal related to the connection from the first audio apparatus.

The controlling method may further include the step of, based on the electronic apparatus and the second audio apparatus not being connected, removing the second audio apparatus from the connection list, and identifying the devices included in the connection list.

The controlling method may further include the step of, based on the audio signal being output from the second audio apparatus, removing the second audio apparatus from the connection list.

The controlling method may further include the step of, based on identifying the predetermined event, storing connection information corresponding to the first audio apparatus.

The controlling method may further include the step of, based on the electronic apparatus and the second audio apparatus not being connected or the audio signal not being output from the second audio apparatus, removing the second audio apparatus from the connection list, and re-connecting the electronic apparatus and the first audio apparatus through low energy Bluetooth communication based on the connection information corresponding to the first audio apparatus.

The controlling method may further include the step of, based on the audio signal being output from the second audio apparatus, removing the second audio apparatus from the connection list, and deleting the connection information corresponding to the first audio apparatus.

The controlling method may further include the steps of, based on devices included in the connection list not existing, displaying a guide screen corresponding to a mute function, and based on receiving a third user input for performing the mute function through the guide screen, performing the mute function.

The guide screen may include text information indicating that the audio signal was output through the electronic apparatus.

BRIEF DESCRIPTION OF THE DRAWINGS

These and/or other aspects, features, and advantages of certain embodiments of the disclosure will be more apparent from the following description taken in conjunction with the accompanying drawings, in which:

FIG. 4 is a diagram illustrating an embodiment wherein connected devices are deleted from a list according to various example embodiments;

DETAILED DESCRIPTION

Figure 1:
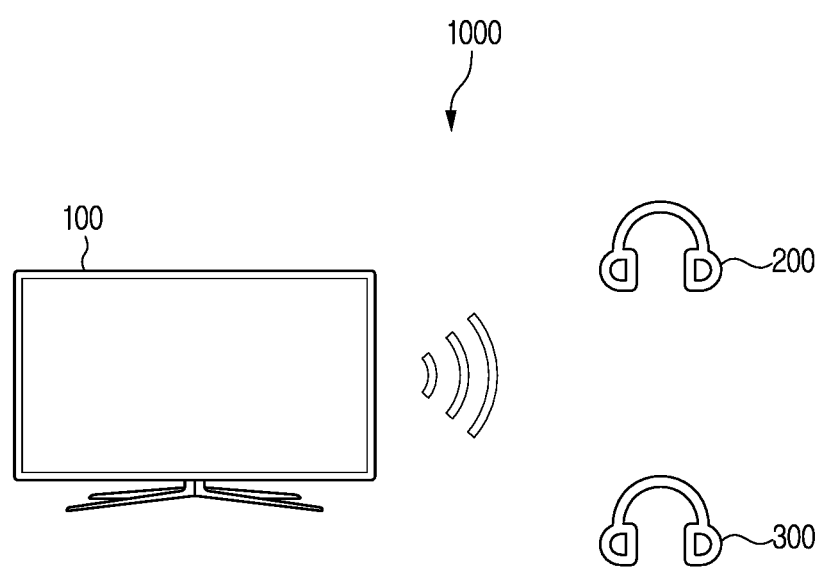
FIG. 1 is a diagram for illustrating a system including an example electronic apparatus and audio apparatuses.

Hereinafter, certain example embodiments will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" and the phrase "A and/or B" should be interpreted to mean any one of "A" or "B" or "A and B."

Further, the expressions "first," "second," and the like used in this specification may be used to describe various elements regardless of any order and/or degree of importance. Also, such expressions are used only to distinguish one element from another element, and are not intended to limit the elements.

Meanwhile, the description in the disclosure that an element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element(s) (e.g.: with at least a third element therebetween).

Also, singular expressions also include plural expressions as long as they do not clearly mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. Also, a plurality of "modules" or "parts" may be integrated into at least one module and implemented as at least one processor (not shown), except "modules" or "parts" which need to be implemented as specific hardware. Thus, each "module" herein may comprise circuitry.

In addition, in this specification, the term "user" may refer to a person who uses an electronic apparatus or an apparatus using an electronic apparatus (e.g.: an artificial intelligence electronic apparatus).

Hereinafter, example embodiments will be described in more detail with reference to the accompanying drawings.

FIG. 1 is a diagram for illustrating a system 1000 including an electronic apparatus 100 and audio apparatuses.

The system 1000 in FIG. 1 may include at least one of an electronic apparatus 100, a first audio apparatus 200, or a second audio apparatus 300. The electronic apparatus 100 may be a device providing an audio signal. The electronic apparatus 100 may be a TV. However, depending on implementation examples, the electronic apparatus 100 may be a terminal device, an edge device, a host device of a local network, an artificial intelligence speaker, etc.

The electronic apparatus 100 may broadcast a low energy (LE) audio signal. The broadcasted audio signal may be received by at least one external apparatus (or an audio apparatus). An audio signal may also be described as a multi audio stream. The electronic apparatus 100 may provide a multi audio stream to at least one audio apparatus.

The at least one audio apparatus may receive the audio signal broadcasted from the electronic apparatus 100. The at least one audio apparatus may output the received audio signal.

In Bluetooth communication, a pairing operation and a connecting operation may be needed. A paring operation may include an operation of transmitting and receiving address information for communicative connection between two parties and an operation of registering devices of the two parties. Also, a paring operation may include a paging operation of identifying address information. Further, a connecting operation may indicate an operation of establishing a communication session between devices after performing a pairing operation and an operation of performing 1:1 communication. According to various embodiments, a paring operation and a connecting operation may be performed as one operation. Meanwhile, a connecting operation may include an operation of transmitting information while devices are bonded to each other.

The electronic apparatus 100 may broadcast low energy (LE) audio to at least one audio apparatus existing around the electronic apparatus 100. The at least one audio apparatus may receive the broadcasted LE audio. The at least one audio apparatus may output the received LE audio.

An embodiment wherein a pairing operation is needed between the electronic apparatus 100 and at least one audio apparatus and an embodiment wherein a pairing operation is not needed may exist.

According to various embodiments, for outputting broadcasted LE audio, the electronic apparatus 100 and at least one audio apparatus may need to be paired in advance. The electronic apparatus 100 may encrypt LE audio. Then, the electronic apparatus 100 may broadcast the encrypted LE audio. The at least one audio apparatus may receive the encrypted LE audio. For outputting the encrypted LE audio, an encryption key may be needed. The at least one audio apparatus may receive an encryption key from the electronic apparatus 100 through a pairing operation. Accordingly, for outputting the encrypted LE audio, the at least one audio apparatus may need a paring operation.

Also, according to various embodiments, a paring operation may not be needed between the electronic apparatus 100 and at least one audio apparatus for outputting broadcasted LE audio. The electronic apparatus 100 may broadcast unencrypted LE audio. The at least one audio apparatus may receive the unencrypted LE audio and output the received LE audio. As the LE audio was not encrypted, the at least one audio apparatus may output the LE audio without a pairing operation.

A connecting operation may be needed between the electronic apparatus 100 and at least one audio apparatus. At least one audio apparatus that received broadcasted LE audio does not output an audio signal only when there is necessarily a connecting operation. However, for synchronizing an audio signal, at least one connection operation may be needed. For specifying an output point of LE audio transmitted from the electronic apparatus 100, sync data may be needed. The electronic apparatus 100 may perform a connecting operation, and then synchronize the connected at least one audio apparatus and the audio signal. The at least one audio apparatus that received the LE audio may receive sync data from the electronic apparatus 100 after the connecting operation. The at least one audio apparatus may output the audio signal based on the received sync data. Then, the electronic apparatus 100 may release the connection with the at least one audio apparatus. Even if the connection is released, the at least one audio apparatus may output the synchronized audio signal.

According to various embodiments, the electronic apparatus 100 may broadcast an audio signal and sync data. At least one audio apparatus may output the received audio signal based on the sync data.

Accordingly, an operation of transmitting an audio signal and sync data may include an embodiment wherein the audio signal and the sync data are transmitted together, and an embodiment wherein the audio signal is broadcasted, and then the sync data is transmitted as a connecting operation is performed.

Figure 2:
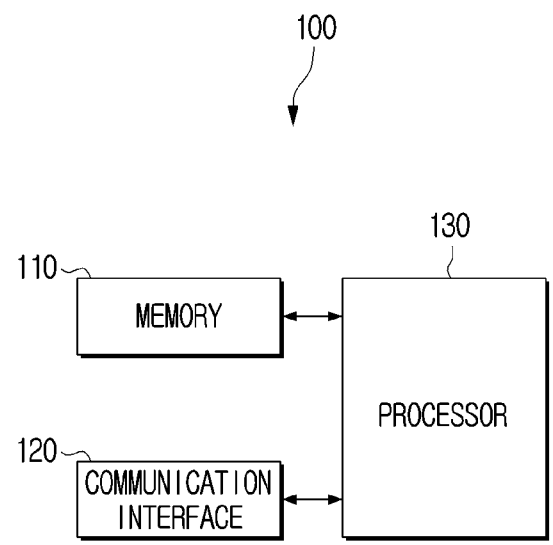
FIG. 2 is a block diagram illustrating an electronic apparatus according to an example embodiment.

FIG. 2 is a block diagram illustrating the electronic apparatus 100 according to an embodiment.

Figure 3:
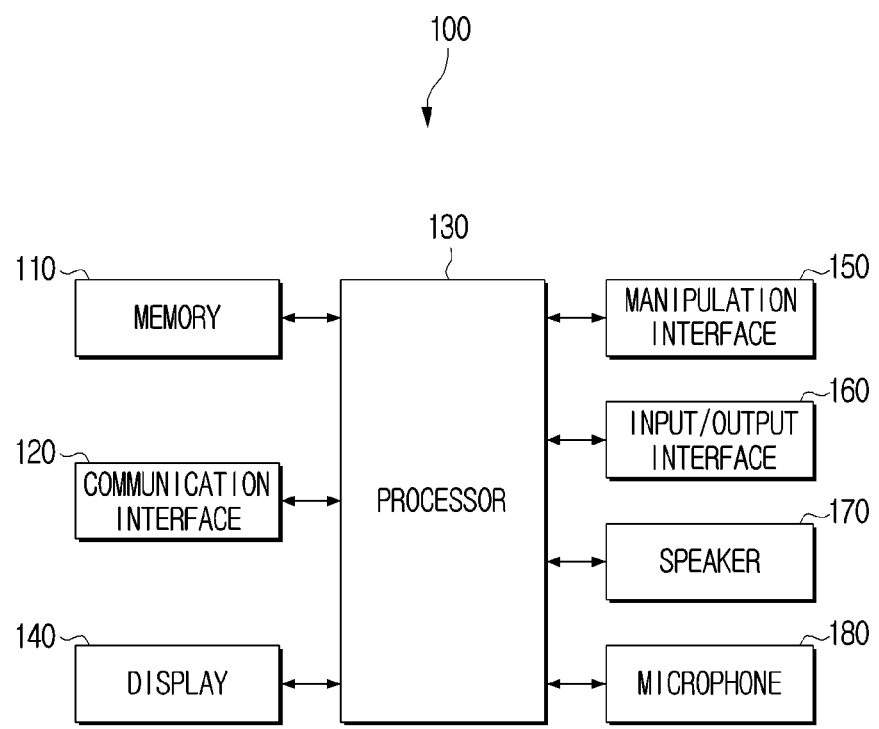
FIG. 3 is a block diagram for illustrating a detailed configuration of the electronic apparatus in FIG. 1.

Referring to FIGS. 2-3, the electronic apparatus 100 may include at least one of a memory 110, a communication interface 120, or at least one processor 130.

The electronic apparatus 100 may be a source apparatus providing an audio signal. For example, the electronic apparatus 100 may be a TV. Also, the electronic apparatus 100 may be a broadcast media source (BMS). An audio signal may be a low energy (LE) audio signal. An audio signal may be broadcasted through the communication interface 120 of the electronic apparatus 100.

The first audio apparatus 200 or the second audio apparatus 300 may be a device receiving an audio signal. For example, the first audio apparatus 200 or the second audio apparatus 300 may be a headset or a wireless earphone, etc. Also, the first audio apparatus 200 or the second audio apparatus 300 may be a broadcast media receiver (BMR).

The memory 110 may store a connection list including devices that can be connected, directly or indirectly, with the electronic apparatus 100. The connection list may include information on devices that can be connected through at least Bluetooth communication for example. The connection list may include identification information of devices that can be connected through Bluetooth communication or various kinds of information that are necessary for connecting through Bluetooth communication.

The communication interface 120 may broadcast an audio signal to the first audio apparatus and the second audio apparatus included in the connection list.

The at least one processor 130 may, based on identifying a predetermined event wherein the audio signal is not output from the first audio apparatus 200, control the communication interface 120 such that the electronic apparatus 100 and the second audio apparatus 300 included in the connection list are connected through at least low energy Bluetooth communication for example, based on the electronic apparatus 100 and the second audio apparatus 300 being connected, transmit a signal requesting output state information to the second audio apparatus 300, based on receiving the output state information of the audio signal from the second audio apparatus 300 through the communication interface 120, identify whether the audio signal is output from the second audio apparatus 300 based on the output state information, based on the audio signal not being output from the second audio apparatus 300, remove (or delete) the second audio apparatus 300 from the connection list, and based on devices included in the connection list not existing, control the communication interface 120 to stop transmission of the audio signal.

The at least one processor 130 may acquire a connection list. The connection list may include information on at least one apparatus that can be connected with the electronic apparatus 100 through Bluetooth communication. The connection list may also be described as a list of devices that can be connected, a list of Bluetooth connection, a list of candidates for Bluetooth communication, a list of activation apparatuses, etc.

The electronic apparatus 100 may not output an audio signal through a speaker 170 (e.g., see FIG. 3) that the electronic apparatus 100 includes in itself, but output an audio signal through an ambient device. The connection list may include information on ambient devices that the electronic apparatus 100 searched to output an audio signal.

The at least one processor 130 may search (or explore) ambient devices to identify devices that can be connected with the electronic apparatus 100. Specifically, the at least one processor 130 may broadcast a predetermined communication packet by using Bluetooth communication. The ambient devices may receive the broadcasted predetermined communication packet, and transmit response information to the electronic apparatus 100. The at least one processor 130 may search the ambient devices based on the received response information.

According to various embodiments, the predetermined communication packet may include information for simply searching whether connection is possible. The predetermined communication packet may also be described as a test packet.

Also, according to various embodiments, the predetermined communication packet may include an audio signal and a signal for searching whether connection is possible (or a request signal of a response). The ambient devices may receive the request signal of a response broadcasted together with the audio signal. Then, in case the ambient devices can be connected with the electronic apparatus 100 that transmitted the request signal of a response, the ambient devices may transmit the response information to the electronic apparatus 100.

The connection list may be different from pairing information permanently storing information on devices that can be connected. The connection list may be information that is used for determining whether to output an audio signal through an ambient device, or to output an audio signal through the built-in speaker 170.

The at least one processor 130 may store the generated connection list in the memory 110.

Meanwhile, if a first user input for connecting with the first audio apparatus 200 among the at least one apparatus included in the connection list is received, the at least one processor 130 may control the communication interface 120 such that the electronic apparatus 100 and the first audio apparatus 200 are connected through low energy Bluetooth communication, and when the electronic apparatus 100 and the first audio apparatus 200 are connected, the at least one processor 130 may transmit an audio signal to the first audio apparatus 200, and remove the first audio apparatus 200 from the connection list.

The at least one processor 130 may connect with an apparatus that the user selected among the plurality of apparatuses included in the connection list. It is assumed that the user selected the first audio apparatus 200. The at least one processor 130 may receive (or acquire) the first user input for connecting with the first audio apparatus 200. Then, the at least one processor 130 may control the communication interface 120 so as to connect with the first audio apparatus 200 through Bluetooth communication based on the received first user input.

When the electronic apparatus 100 and the first audio apparatus 200 are connected through Bluetooth communication, the at least one processor 130 may change (or amend) the connection list. Specifically, the at least one processor 130 may remove (or delete) the first audio apparatus 200 from the connection list. The reason for deleting the first audio apparatus 200 from the connection list even though the electronic apparatus 100 and the first audio apparatus 200 are connected is that the first audio apparatus 200 does not need to exist in the connection list anymore. When the electronic apparatus 100 and the first audio apparatus 200 are connected and then the connection is released, there may be a very low possibility that the first audio apparatus 200 and the electronic apparatus 100 are connected again. Accordingly, when the first audio apparatus 200 is connected once, the at least one processor 130 may remove the first audio apparatus 200 from the connection list.

If a predetermined event is identified, the at least one processor 130 may control the communication interface 120 so as to release the connection with the first audio apparatus 200.

Meanwhile, the predetermined event may include at least one of an event wherein the first user input for releasing the connection with the first audio apparatus 200 was received, an event wherein it is identified that the first audio apparatus 200 is not outputting an audio signal, or an event wherein response information related to the connection is not received from the first audio apparatus 200.

The predetermined event may include various events related to a situation wherein an audio signal is not output anymore from the first audio apparatus 200. An event wherein the first user input for releasing the connection with the first audio apparatus 200 was received may be an event wherein an instruction for releasing the connection with the first audio apparatus 200 was input into the electronic apparatus 100 by the user.

An event wherein it is identified that the first audio apparatus 200 is not outputting an audio signal may be an event wherein a value indicating that an audio signal is not being output is included in the output state information received from the first audio apparatus 200. The first audio apparatus 200 may determine to not output an audio signal anymore based on a user input or a predetermined control instruction. In the case of not outputting an audio signal anymore, the first audio apparatus 200 may generate output state information including a second value indicating that an audio signal is not being output normally, and transmit the generated output state information to the electronic apparatus 100. The electronic apparatus 100 may identify that the first audio apparatus 200 is not currently outputting an audio signal based on the output state information received from the first audio apparatus 200.

An event wherein response information related to the connection is not received from the first audio apparatus 200 may indicate an event wherein response information corresponding to a response request signal is not received from the first audio apparatus 200.

When it is identified that the predetermined event occurred, the at least one processor 130 may release the connection with the first audio apparatus 200. Then, when the connection with the first audio apparatus 200 is released, the at least one processor 130 may identify whether devices (or apparatuses) included in the connection list exist. If devices included in the connection list do not exist, the at least one processor 130 may output an audio signal through the speaker 170. The speaker 170 may be hardware outputting an audio signal.

In case devices included in the connection list do not exist, the at least one processor 130 may determine that there are no external devices (or ambient devices) that will output an audio signal anymore. After an audio signal is output from the first audio apparatus 200, if an audio signal is not output due to occurrence of the predetermined event, the user may feel inconvenient due to non-output of an audio signal. Accordingly, if no external apparatuses to output an audio signal are identified anymore, the at least one processor 130 may immediately output an audio signal through the speaker 170. The user may listen to an audio signal through the speaker 170 even if an audio signal is not output from the first audio apparatus 200.

In case devices included in the connection list exist, the at least one processor 130 may select one device among the at least one device included in the connection list.

There may be various methods for selecting a device included in the connection list.

According to various embodiments, the at least one processor 130 may select a device included in the connection list by itself. It is assumed that the selected device is the second audio apparatus 300. While an audio signal is being output from the first audio apparatus 200, the at least one processor 130 may acquire a second user instruction selecting the subject for connection as the second audio apparatus 300. When the second user instruction is acquired, the at least one processor 130 may attempt connection with the second audio apparatus 300.

Also, according to various embodiments, the at least one processor 130 may automatically select one device among the devices included in the connection list. It is assumed that the automatically selected device is the second audio apparatus 300. If the predetermined event occurs while an audio signal is being output from the first audio apparatus 200, the at least one processor 130 may release the connection with the first audio apparatus 200, and attempt connection with the second audio apparatus 300.

Meanwhile, if the electronic apparatus 100 and the second audio apparatus 300 are not connected, the at least one processor 130 may remove the second audio apparatus 300 from the connection list, and identify devices included in the connection list.

Even if the at least one processor 130 attempted connection with the second audio apparatus 300, connection between the electronic apparatus 100 and the second audio apparatus 300 may fail due to various reasons (e.g., there is no response from the second audio apparatus 300). If connection with the second audio apparatus 300 fails, the at least one processor 130 may remove the second audio apparatus 300 from the connection list. This is because the second audio apparatus 300 does not need to exist in the connection list, as it is impossible to output an audio signal from the second audio apparatus 300.

When the electronic apparatus 100 and the second audio apparatus 300 are connected, the at least one processor 130 may transmit an audio signal to the second audio apparatus 300. Also, the at least one processor 130 may transmit an audio signal and a signal requesting output state information of the audio signal together to the second audio apparatus 300.

The output state information may indicate information indicating whether an audio signal is being output normally.

The second audio apparatus 300 may receive the audio signal and the signal requesting the output state information from the electronic apparatus 100. In case the audio signal is output from the second audio apparatus 300, the second audio apparatus 300 may transmit (or return) a first value indicating that the audio signal is being output normally to the electronic apparatus 100. In case the audio signal is not output from the second audio apparatus 300, the second audio apparatus 300 may transmit (or return) a second value indicating that the audio signal is not being output normally to the electronic apparatus 100. The first value or the second value may be included in the output state information. The output state information may be acquired by a broadcast media receiver (BMR) of the second audio apparatus 300. The BMR of the second audio apparatus 300 may generate output state information. Also, the BMR of the second audio apparatus 300 may generate output state information by using a generic attribute profile (GATT) protocol.

The at least one processor 130 may acquire the output state information from the second audio apparatus 300. The at least one processor 130 may determine whether an audio signal is being output from the second audio apparatus 300 based on the output state information.

Meanwhile, if an audio signal is output from the second audio apparatus 300, the at least one processor 130 may remove the second audio apparatus 300 from the connection list.

Meanwhile, if an audio signal is not output from the second audio apparatus 300, the at least one processor 130 may remove the second audio apparatus 300 from the connection list. This is because the second audio apparatus 300 does not need to exist in the connection list as it is impossible to output an audio signal from the second audio apparatus 300.

In case the predetermined event is identified and connection with the second audio apparatus 300 fails, the at least one processor 130 may determine whether devices included in the connection list exist.

In case the predetermined event is identified and it is identified that an audio signal is not being output normally from the second audio apparatus 300, the at least one processor 130 may determine whether devices included in the connection list exist.

In case devices included in the connection list do not exist, the at least one processor 130 may output an audio signal through the speaker 170. Also, in case devices included in the connection list do not exist, the at least one processor 130 may stop the operation of updating the connection list. The at least one processor 130 may stop the operation of broadcasting at least one of an audio signal or a response request signal.

Meanwhile, if the predetermined event is identified, the at least one processor 130 may store connection information corresponding to the first audio apparatus 200 in the memory 110.

After the connection with the first audio apparatus 200, the at least one processor 130 may remove the first audio apparatus 200 from the connection list. Accordingly, a re-connecting operation with the first audio apparatus 200 through the connection list may be difficult. Accordingly, if an event wherein the connection with the first audio apparatus 200 is released occurs, the at least one processor 130 may temporarily store the connection information corresponding to the first audio apparatus 200 in the memory 110. The connection information may include various kinds of information (or parameters) necessary for connecting through Bluetooth communication. If it is determined that re-connection with the first audio apparatus 200 is needed, the at least one processor 130 may control the communication interface 120 to re-connect with the first audio apparatus 200 by using the connection information.

Meanwhile, if the electronic apparatus 100 and the second audio apparatus 300 are not connected or an audio signal is not output from the second audio apparatus 300, the at least one processor 130 may remove the second audio apparatus 300 from the connection list, and control the communication interface 120 such that the electronic apparatus 100 and the first audio apparatus 200 are re-connected through low energy Bluetooth communication based on the connection information corresponding to the first audio apparatus 200.

If connection between the electronic apparatus 100 and the second audio apparatus 300 fails, the at least one processor 130 may attempt re-connection with the first audio apparatus 200 based on the temporarily stored connection information.

Also, if it is identified that an audio signal is not output from the second audio apparatus 300 based on the output state information received from the second audio apparatus 300, the at least one processor 130 may attempt re-connection with the first audio apparatus 200 based on the temporarily stored connection information.

Meanwhile, if an audio signal is output from the second audio apparatus 300, the at least one processor 130 may remove the second audio apparatus 300 from the connection list, and delete the connection information corresponding to the first audio apparatus 200.

If it is identified that an audio signal is output from the second audio apparatus 300 based on the output state information received from the second audio apparatus 300, the at least one processor 130 may delete the temporarily stored connection information. As an audio signal is already being output normally from the second audio apparatus 300, the at least one processor 130 may determine that there is a very low possibility that the user connects to the first audio apparatus 200 again.

Meanwhile, the electronic apparatus 100 may further include a display 140 (e.g., see FIG. 3), and if devices included in the connection list do not exist, the at least one processor 130 may control the display 140 to display a guide screen requesting a mute function, and if a third user input for performing the mute function is received through the guide screen, the at least one processor 130 may perform the mute function.

Meanwhile, the guide screen may include text information indicating that an audio signal is output through the speaker 170.

Detailed explanation in this regard will be described in FIG. 16 to FIG. 17.

Figure 16:
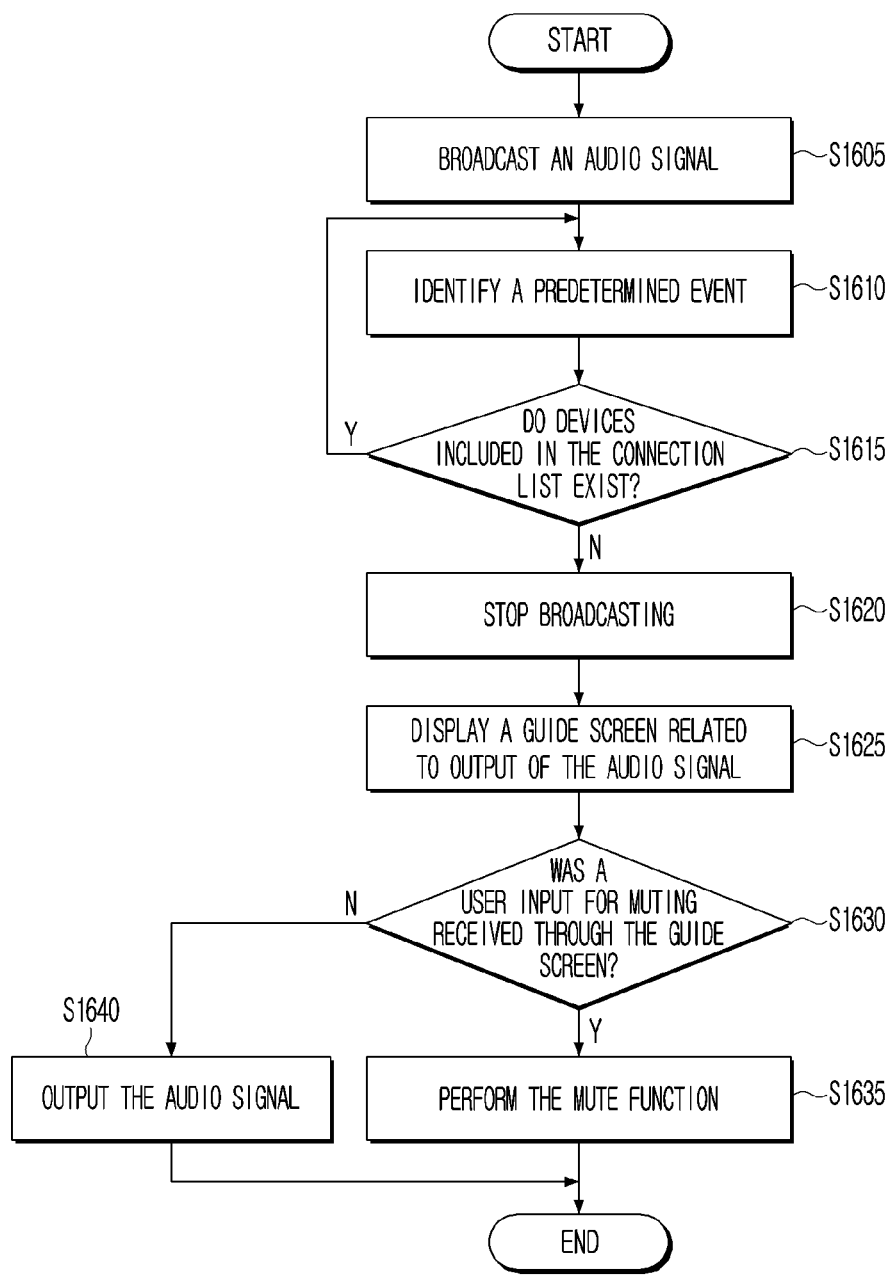
FIG. 16 is a flow chart for illustrating an operation related to a mute function according to various example embodiments.
Figure 17:
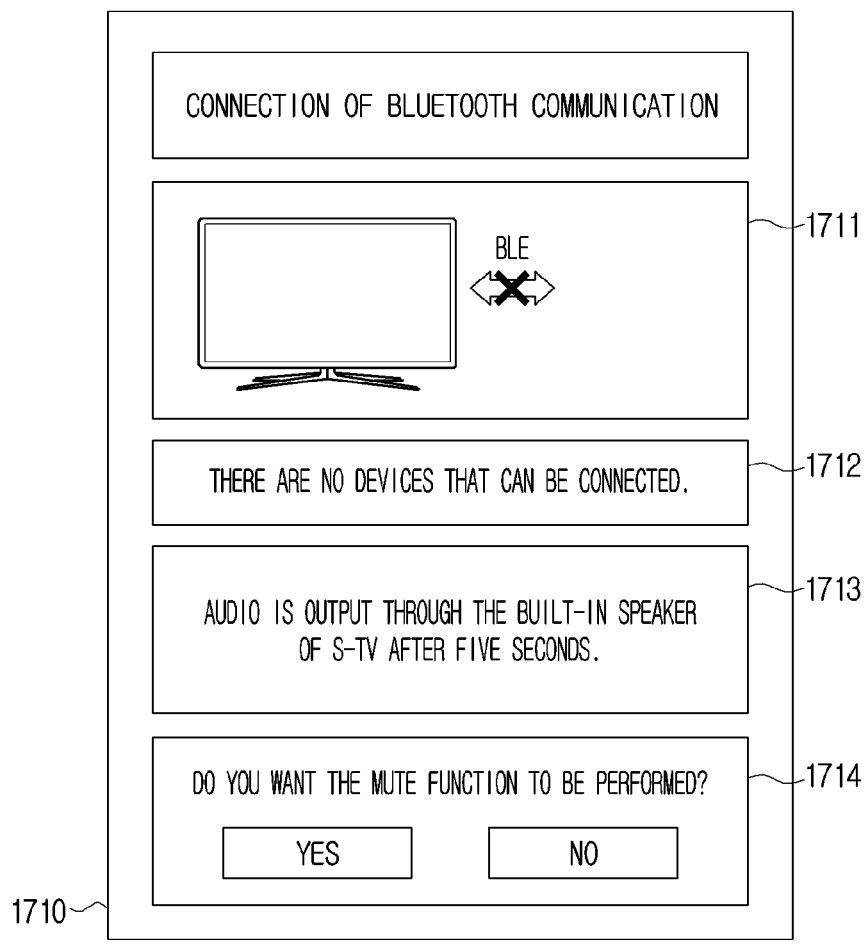
FIG. 17 is a diagram for illustrating an example operation related to a mute function.

In FIG. 16 to FIG. 17, a basic operation may be an operation of outputting an audio signal through the speaker 170. Limited to a case wherein a user input for performing the mute function is received, the at least one processor 130 may perform the mute function and may not output an audio signal.

Figure 18:
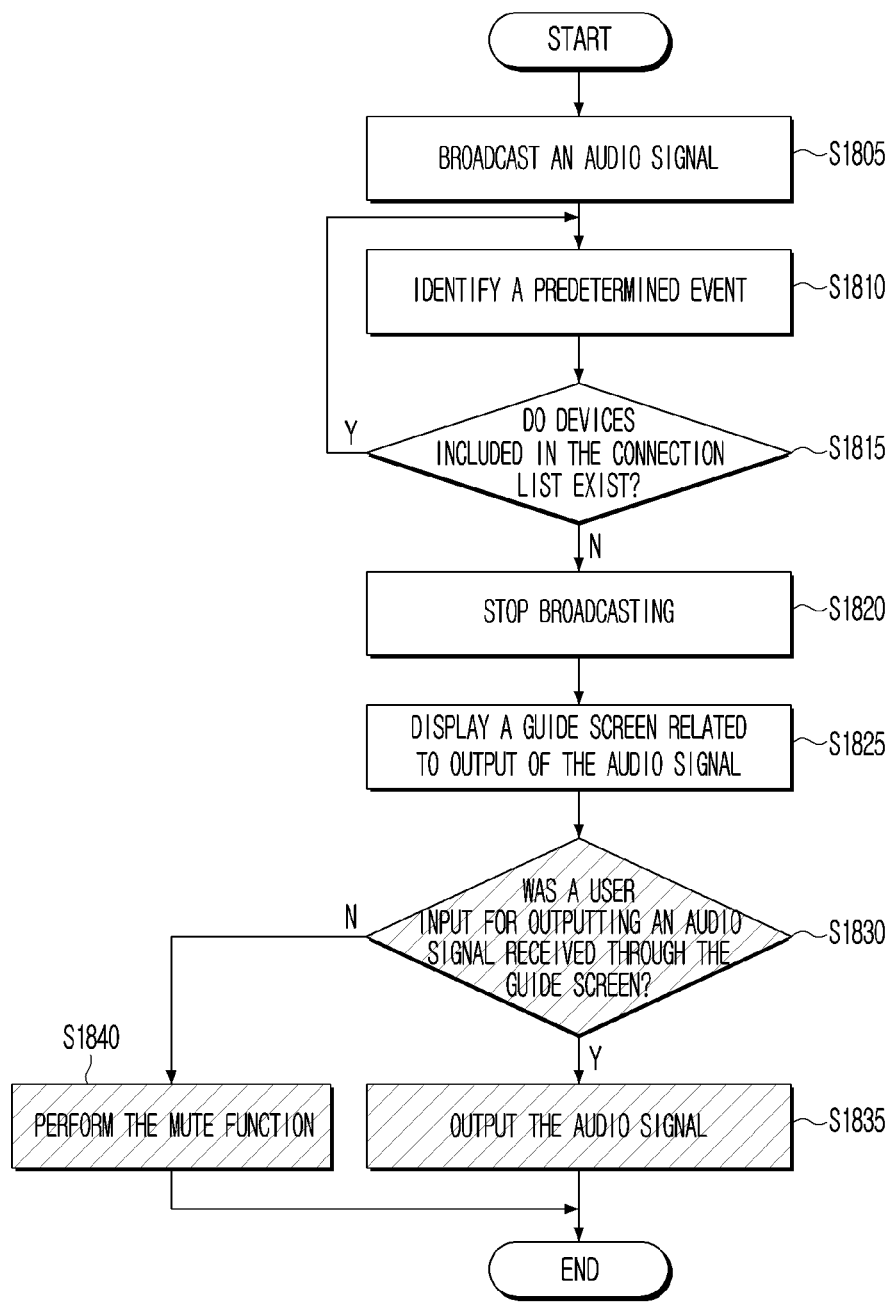
FIG. 18 is a flow chart for illustrating an example operation of outputting an audio signal through a built-in speaker.
Figure 19:
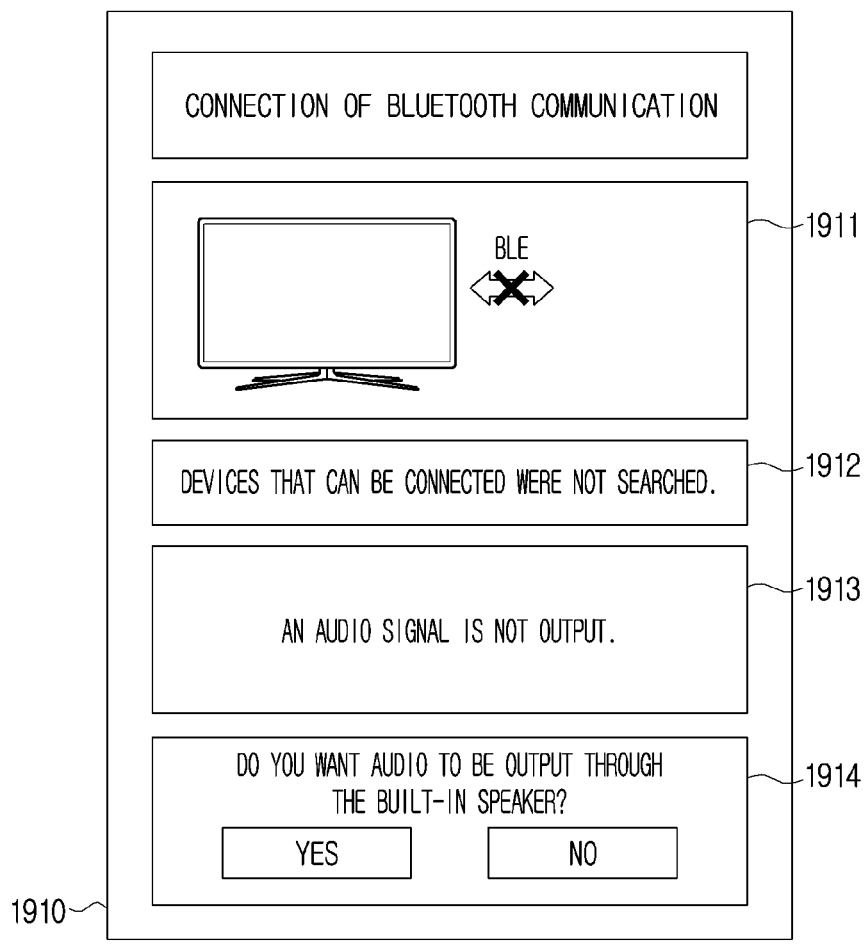
FIG. 19 is a diagram for illustrating an example operation of outputting an audio signal through a built-in speaker.

In FIG. 18 to FIG. 19, a basic operation may be an operation of performing the mute function. Limited to a case wherein a user input for outputting an audio signal is received, the at least one processor 130 may output an audio signal.

In the case of providing a content including an image signal and an audio signal, the at least one processor 130 may output an image signal on the display 140, but may not output an audio signal. Accordingly, the mute function may be a function applied only to an audio signal.

Meanwhile, the at least one processor 130 may initialize the connection list. The initializing operation may indicate deleting the previous connection list, and generating a new connection list. For generating a new connection list, the at least one processor 130 may perform a searching operation of ambient devices including a broadcasting operation.

If an event wherein an instruction for turning off the power of the electronic apparatus 100 is received or an event wherein a user input for initializing the connection list is identified, the at least one processor 130 may delete the connection list, and generate a new connection list.

Meanwhile, there may be various time points when an operation of searching ambient devices is performed.

According to various embodiments, the electronic apparatus 100 may continuously search ambient devices from a time point when the electronic apparatus 100 is turned on to a time point when no devices are included in the connection list. Even if the electronic apparatus 100 is connected to a specific device, the electronic apparatus 100 may continuously search ambient devices.

Also, according to various embodiments, the electronic apparatus 100 may search ambient devices from a time point when the electronic apparatus 100 is turned on to a time point when the electronic apparatus 100 is connected to a specific apparatus. Also, the electronic apparatus 100 may search ambient devices from a time point when the connection with the specific apparatus is released to a time point when the electronic apparatus 100 is connected to a new apparatus. The electronic apparatus 100 may search ambient devices only in cases wherein a process of searching a subject for connection is needed.

There may be various methods for transmitting a signal.

According to various embodiments, an audio signal may be transmitted by a broadcasting method.

Also, according to various embodiments, an audio signal may be transmitted by a broadcasting method before connection, and may be transmitted by a direct method after connection.

Further, according to various embodiments, a response request signal may be transmitted by a broadcasting method, and an audio signal may be transmitted by a direct method.

Meanwhile, there may be various time points of deleting an apparatus from the connection list.

In case there are no devices existing in the connection list, the electronic apparatus 100 according to the various embodiments may not perform an operation of broadcasting (or transmitting) an audio signal meaninglessly. Accordingly, a resource or power can be saved.

According to various embodiments, the electronic apparatus 100 may perform an operation of broadcasting an audio signal and an operation of receiving a response signal (or response information or output state information, etc.) from at least one audio apparatus. An external server that is communicatively connected, directly or indirectly, with the electronic apparatus 100 may manage the connection list. The electronic apparatus 100 may transmit the information received from the audio apparatus to the external server. Then, the external server may generate (or update or amend) the connection list based on the information received from the electronic apparatus 100. The external server may transmit the connection list to the electronic apparatus 100. The electronic apparatus 100 may acquire the connection list from the external server, and determine whether devices included in the connection list exist. In case devices included in the connection list do not exist, the electronic apparatus 100 may not broadcast an audio signal anymore.

FIG. 3 is a block diagram for illustrating a detailed configuration of the electronic apparatus 100 in FIG. 1.

Referring to FIG. 3, the electronic apparatus 100 may include at least one of a memory 110, a communication interface 120, at least one processor 130, a display 140, a manipulation interface 150, an input/output interface 160, a speaker 170, or a microphone 180. Regarding the same operations as those explained above, overlapping explanation will be omitted.

The electronic apparatus 100 according to the various embodiments of this specification may include, for example, at least one of a smartphone, a tablet PC, a mobile phone, a desktop PC, a laptop PC, a PDA, or a portable multimedia player (PMP). In some embodiments, the electronic apparatus 100 may include, for example, at least one of a television, a digital video disk (DVD) player, or a media box (e.g.: Samsung HomeSync™, Apple TV™ or Google TV™).

The memory 110 may be implemented as an internal memory such as a ROM included in the processor 130 (e.g., an electrically erasable programmable read-only memory (EEPROM)), a RAM, etc., or implemented as a separate memory from the processor 130. In this case, the memory 110 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

Meanwhile, in the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected, directly or indirectly, to a USB port (e.g., a USB memory), etc.

The communication interface 120 is a component performing communication with various types of external apparatuses according to various types of communication methods. The communication interface 120 may include a wireless communication module or a wired communication module. Here, each communication module may be implemented in a form of at least one hardware chip comprising communication circuitry.

A wireless communication module may be a module communicating with an external apparatus wirelessly. For example, a wireless communication module may include at least one module among a Wi-Fi module, a Bluetooth module, an infrared communication module, or other communication modules.

A Wi-Fi module and a Bluetooth communication module may perform communication by a Wi-Fi method and a Bluetooth method, respectively. In the case of using a Wi-Fi module or a Bluetooth module, various types of connection information such as a service set identifier (SSID) and a session key is transmitted and received first, and connection of communication is performed by using the information, and various types of information can be transmitted and received thereafter.

An infrared communication module performs communication according to an infrared Data Association (IrDA) technology of transmitting data to a near field wirelessly by using infrared rays between visible rays and millimeter waves.

Other communication modules may include at least one communication chip performing communication according to various wireless communication protocols such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

A wired communication module may be a module performing communication with an external apparatus via wire. For example, a wired communication module may include at least one of a local area network (LAN) module, an Ethernet module, a pair cable, a coaxial cable, an optical fiber cable, or an ultra wide-band (UWB) module. As discussed herein, each "module" herein may comprise circuitry.

The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an advanced reduced instruction set computer (RISC) machines (ARM) processor, or may be defined by the terms. Also, the processor 130 may be implemented as a system on chip (SoC) having a processing algorithm stored therein or large scale integration (LSI), or implemented in the form of a field programmable gate array (FPGA). In addition, the processor 130 may perform various functions by executing computer executable instructions stored in the memory. Each processor herein comprises processing circuitry.

The display 140 may be implemented as various forms of displays such as a liquid crystal display (LCD), an organic light emitting diodes (OLED) display, a plasma display panel (PDP), etc. Inside the display 140, driving circuits that may be implemented in forms such as an amorphous silicon thin film transistor (a-si TFT), a low temperature poly silicon (LTPS) TFT, an organic TFT (OTFT), etc., a backlight unit, etc. may also be included. Meanwhile, the display 140 may be implemented as a touch screen combined with a touch sensor, a flexible display, a three-dimensional (3D) display, etc. Also, the display 140 according to an embodiment may include not only a display panel outputting images, but also a bezel housing the display panel. In particular, a bezel according to an embodiment may include a touch sensor (not shown) for detecting user interactions.

According to various embodiments, the electronic apparatus 100 may include a display 140. Specifically, the electronic apparatus 100 may directly display an image or a content acquired on the display 140.

Also, according to various embodiments, the electronic apparatus 100 may not include the display 140. The electronic apparatus 100 may be connected, directly or indirectly, with an external display apparatus, and transmit an image or a content stored in the electronic apparatus 100 to the external display apparatus. Specifically, the electronic apparatus 100 may transmit an image or a content to the external display apparatus together with a control signal for controlling such that the image or the content is displayed on the external display apparatus. Here, the external display apparatus may be connected with the electronic apparatus 100 through the communication interface 120 or the input/output interface 160. For example, the electronic apparatus 100 may not include a display like a set top box (STB). Also, the electronic apparatus 100 may only include a small-size display that can display only simple information such as text information, etc. Here, the electronic apparatus 100 may transmit an image or a content to the external display apparatus via wire or wirelessly through the communication interface 120, or transmit them to the external display apparatus through the input/output interface 160.

The manipulation interface 150 may be implemented as an apparatus such as a button, a touch pad, a mouse, and a keyboard, or implemented as a touch screen that can perform both of the aforementioned display function and a manipulation input function. Here, a button may be various types of buttons such as a mechanical button, a touch pad, a wheel, etc. formed in any areas such as the front surface part or the side surface part, the rear surface part, etc. of the exterior of the main body of the electronic apparatus 100.

The input/output interface 160 may be any one interface among a high definition multimedia interface (HDMI), a mobile high-definition link (MHL), a universal serial bus (USB), a display port (DP), a Thunderbolt, a video graphics array (VGA) port, an RGB port, a D-subminiature (D-SUB), and a digital visual interface (DVI). The input/output interface 160 may input or output at least one of an audio signal or a video signal. Depending on implementation examples, the input/output interface 160 may include a port inputting and outputting only audio signals and a port inputting and outputting only video signals as separate ports, or it may be implemented as one port that inputs and outputs both audio signals and video signals. Meanwhile, the electronic apparatus 100 may transmit at least one of an audio signal or a video signal to an external apparatus (e.g., an external display apparatus or an external speaker) through the input/output interface 160. Specifically, an output port included in the input/output interface 160 may be connected with an external apparatus, and the electronic apparatus 100 may transmit at least one of an audio signal or a video signal to the external apparatus through the output port.

Here, the input/output interface 160 may be connected with the communication interface. The input/output interface 160 may transmit information received from an external apparatus to the communication interface, or transmit information received through the communication interface to the external apparatus.

The speaker 170 may be a component that outputs not only various kinds of audio data, but also various kinds of notification sounds or voice messages, etc.

The microphone 180 is a component for receiving input of a user voice or other sounds, and converting them into audio data. The microphone 180 may receive a user's voice in an activated state. For example, the microphone 180 may be formed as an integrated type integrated to the upper side or the front surface direction, the side surface direction, etc. of the electronic apparatus 100. The microphone 180 may include various components such as a microphone collecting a user voice in an analogue form, an amp circuit amplifying the collected user voice, an A/D conversion circuit that samples the amplified user voice and converts the user voice into a digital signal, a filter circuit that removes noise components from the converted digital signal, etc.

FIG. 4 is a diagram illustrating an embodiment wherein connected devices are deleted from a list according to various embodiments.

Referring to FIG. 4, the electronic apparatus 100 may delete a device that was connected once from the connection list.

The electronic apparatus 100 may generate a list of external devices that can be connected. Here, the list may be a list of devices for connection. The list of devices for connection may be a list of devices that can be connected with the electronic apparatus 100.

Also, the list of devices for connection may indicate a list of devices that have a possibility of being connected in consideration of a user intent. A device that has a very low possibility of being connected as it does not suit the user's intent anymore, even though it can actually be connected, may exist. In this case, the electronic apparatus 100 may exclude the device having a very low possibility of being connected from the list.

The electronic apparatus 100 may store all devices that can be initially connected in the connection list. Then, the electronic apparatus 100 may immediately remove the device connected with the electronic apparatus 100 from the connection list. In case the connection of the device connected with the electronic apparatus 100 is released, the possibility that the released device may be connected with the electronic apparatus 100 again may be low. Accordingly, the electronic apparatus 100 may exclude the connected device from the connection list.

The connection list 410 may be a list that the electronic apparatus 100 generated by searching (or exploring) devices that can be initially connected. Accordingly, in the connection list 410, all devices that can be connected with the electronic apparatus 100 may be included. For example, the electronic apparatus 100 may search that devices that can be connected with the electronic apparatus 100 are s-buds1, s-buds2, s-speaker, and s-remote. Then, the electronic apparatus 100 may generate the connection list 410 including the searched four devices.

The connection list 420 may indicate a connection list after connection with one device failed after searching of devices that can be connected. The electronic apparatus 100 may remove (or delete) the device of which connection failed from the connection list. For example, it is assumed that connection of the electronic apparatus 100 with "s-buds1" failed. The electronic apparatus 100 may remove "s-buds1" from the connection list 410, and acquire the changed connection list 420.

The connection list 430 may be a list after the electronic apparatus 100 identified that another device (s-buds2) is not in an outputting state. The electronic apparatus 100 may remove (or delete) the device that is not in an outputting state from the connection list. For example, it is assumed that the connection of the electronic apparatus 100 with "s-buds1" was released and the electronic apparatus 100 was connected with "s-buds2." Also, it is assumed that "s-buds2" is not in a state of outputting an audio signal. The electronic apparatus 100 may remove "s-buds2" from the connection list 420, and acquire the changed connection list 430.

Figure 5:
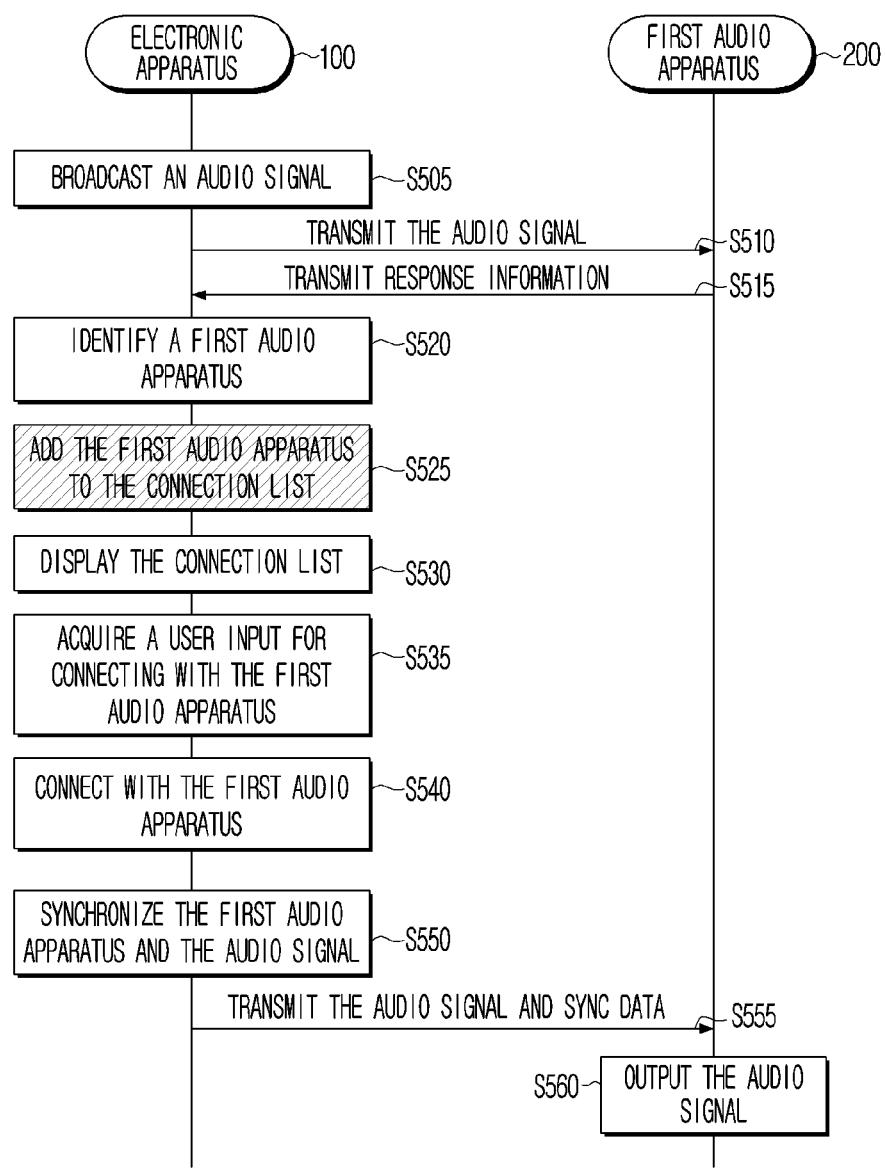
FIG. 5 is a flow chart for illustrating an operation of outputting an audio signal from a first audio apparatus according to various example embodiments.

FIG. 5 is a flow chart for illustrating an operation of outputting an audio signal from the first audio apparatus 200 according to various embodiments.

Referring to FIG. 5, the electronic apparatus 100 may broadcast an audio signal in operation S505. The broadcasting operation may indicate a data transmission method of not specifying a device receiving data. Through the broadcasting method, the electronic apparatus 100 may transmit the audio signal to the first audio apparatus 200 in operation S510.

The first audio apparatus 200 may receive the audio signal broadcasted from the electronic apparatus 100. When the first audio apparatus 200 that can be connected with the electronic apparatus 100 receives the audio signal, the first audio apparatus 200 may transmit response information to the electronic apparatus 100 in operation S515. Here, the response information may include a signal indicating that connection is possible, in case the broadcasted audio signal was received.

The electronic apparatus 100 may receive the response information transmitted by the first audio apparatus 200. Then, the electronic apparatus 100 may identify the first audio apparatus 200 based on the response information in operation S520. The electronic apparatus 100 may determine that connection with the first audio apparatus 200 is possible.

The electronic apparatus 100 may add the first audio apparatus 200 to the connection list in operation S525. The electronic apparatus 100 may generate (or acquire) a connection list including the first audio apparatus 200. The operation of adding the first audio apparatus 200 to the connection list may be an operation of storing information related to the first audio apparatus 200 in the connection list. The information related to the first audio apparatus 200 may indicate identification information and a parameter necessary for connection.

The electronic apparatus 100 may display the connection list on the display included in the electronic apparatus 100 in operation S530. The electronic apparatus 100 may acquire a user input for connecting with the first audio apparatus 200 through the displayed connection list in operation S535. Then, the electronic apparatus 100 may connect with the first audio apparatus 200 in operation S540.

Then, the electronic apparatus 100 may perform synchronization of the audio signal with the first audio apparatus 200 in operation S550. The electronic apparatus 100 may transmit the audio signal and sync data to the first audio apparatus 200 in operation S555.

The first audio apparatus 200 may receive the audio signal and the sync data from the electronic apparatus 100. The first audio apparatus 200 may output the audio signal based on the sync data in operation S560.

Figure 6:
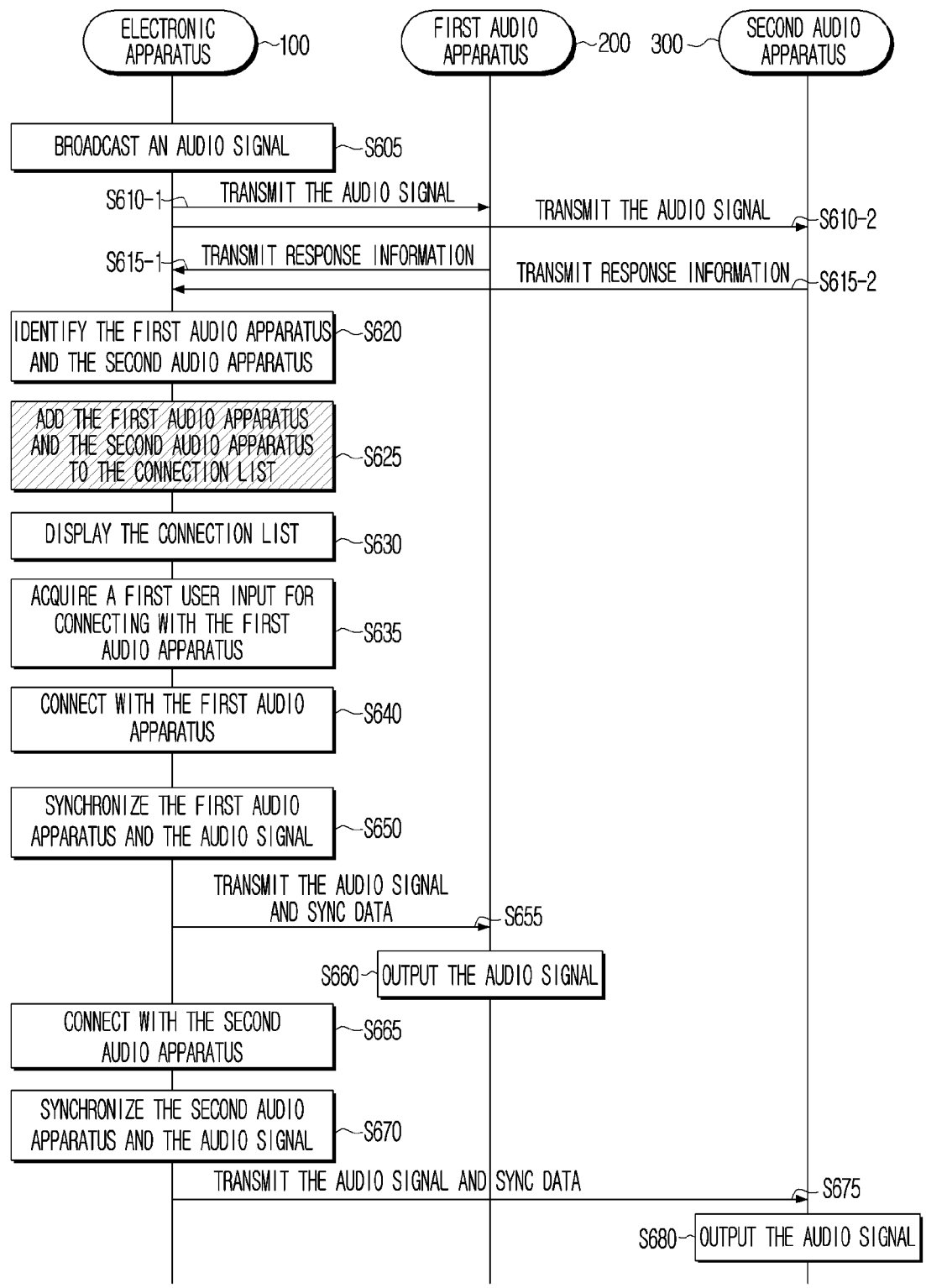
FIG. 6 is a flow chart for illustrating an operation of outputting an audio signal from a first audio apparatus among a plurality of audio apparatuses according to various example embodiments.

FIG. 6 is a flow chart for illustrating an operation of outputting an audio signal from the first audio apparatus 200 among a plurality of audio apparatuses according to various embodiments.

Referring to FIG. 6, the electronic apparatus 100 may broadcast an audio signal in operation S605. The broadcasting operation may indicate a data transmission method of not specifying a device receiving data. Through the broadcasting method, the electronic apparatus 100 may transmit the audio signal to the first audio apparatus 200 in operation S610-1. Also, through the broadcasting method, the electronic apparatus 100 may transmit the audio signal to the second audio apparatus 300 in operation S610-2.

The first audio apparatus 200 may receive the audio signal broadcasted from the electronic apparatus 100. When the first audio apparatus 200 that can be connected with the electronic apparatus 100 receives the audio signal, the first audio apparatus 200 may transmit response information to the electronic apparatus 100 in operation S615-1. When the second audio apparatus 300 that can be connected with the electronic apparatus 100 receives the audio signal, the second audio apparatus 300 may transmit response information to the electronic apparatus 100 in operation S615-2. The response information may include a signal indicating that connection is possible, in case the broadcasted audio signal was received.

The electronic apparatus 100 may receive the response information transmitted by the first audio apparatus 200 and the response information transmitted by the second audio apparatus 300. Then, the electronic apparatus 100 may identify the first audio apparatus 200 and the second audio apparatus 300 based on the response information in operation S620. The electronic apparatus 100 may determine that connection with the first audio apparatus 200 and the second audio apparatus 300 is possible.

The electronic apparatus 100 may add the first audio apparatus 200 and the second audio apparatus 300 to the connection list in operation S625. The electronic apparatus 100 may generate (or acquire) a connection list including the first audio apparatus 200 and the second audio apparatus 300. The operation of adding the first audio apparatus 200 and the second audio apparatus 300 to the connection list may be an operation of storing information related to the devices that transmitted response information in the connection list. The information related to the devices that transmitted response information may indicate identification information and a parameter necessary for connection.

The electronic apparatus 100 may display the connection list on the display included in the electronic apparatus 100 in operation S630. The electronic apparatus 100 may acquire a first user input for connecting with the first audio apparatus 200 through the displayed connection list in operation S635. Then, the electronic apparatus 100 may connect with the first audio apparatus 200 in operation S640.

Then, the electronic apparatus 100 may perform synchronization of the first audio apparatus 200 and the audio signal in operation S650. The electronic apparatus 100 may transmit the audio signal and sync data to the first audio apparatus 200 in operation S655.

The first audio apparatus 200 may receive the audio signal and the sync data from the electronic apparatus 100. The first audio apparatus 200 may output the audio signal based on the sync data in operation S660.

Also, the electronic apparatus 100 may release the connection with the first audio apparatus 200 and connect with the second audio apparatus 300 in operation S665. The electronic apparatus 100 may synchronize the second audio apparatus 300 and the audio signal in operation S670. The electronic apparatus 100 may transmit the audio signal and sync data to the second audio apparatus 300 in operation S675.

The second audio apparatus 300 may receive the audio signal and the sync data from the electronic apparatus 100. Then, the second audio apparatus 300 may output the audio signal based on the sync data in operation S680.

Figure 7:
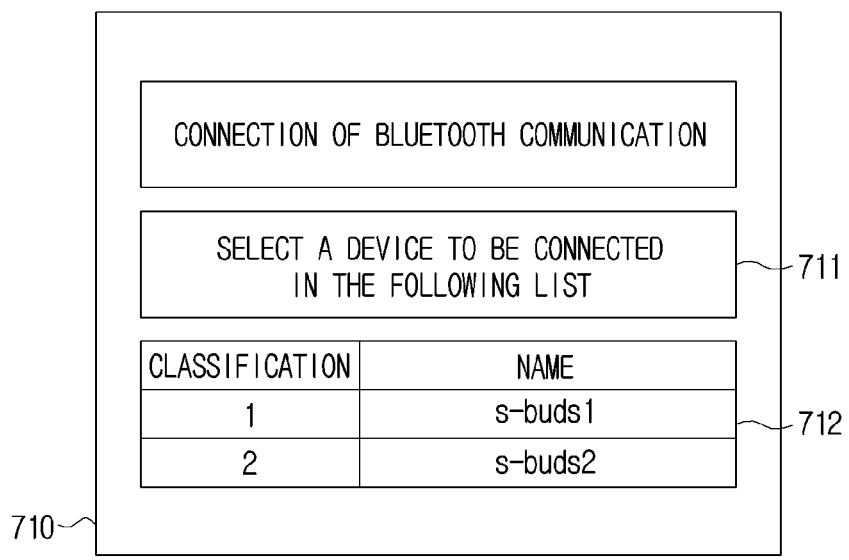
FIG. 7 is a diagram for illustrating an operation of displaying an example connection list.

FIG. 7 is a diagram for illustrating an operation of displaying a connection list.

Referring to FIG. 7, the electronic apparatus 100 may display a screen 710 related to a connection list. The screen 710 may include at least one of text information 711 requesting to the user to select a device to be connected or a connection list 712.

The electronic apparatus 100 may display the screen 710 guiding the user to directly select a device that can be connected. The user can directly identify devices that can be connected through the connection list 712 included in the screen 710.

Figure 8:
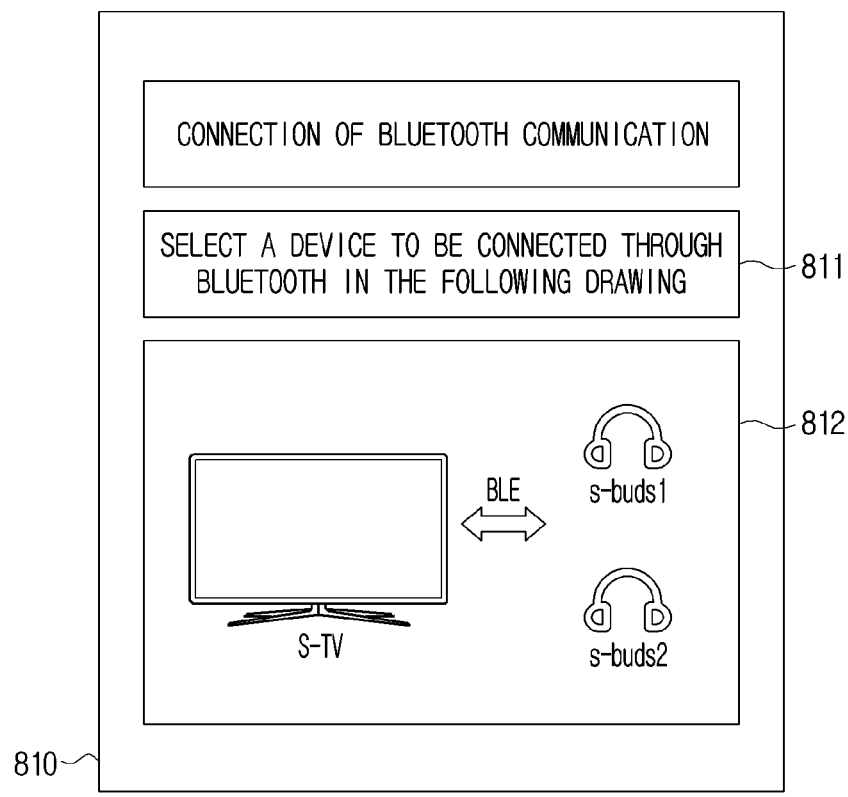
FIG. 8 is a diagram for illustrating an example operation of selecting a device to be connected.

FIG. 8 is a diagram for illustrating an operation of selecting a device to be connected.

Referring to FIG. 8, the electronic apparatus 100 may display a screen 810 related to devices that can be connected. The screen 810 may include at least one of text information 811 requesting the user to select a device to be connected or an image 812 of devices that can be connected.

The electronic apparatus 100 may display the screen 810 guiding the user to directly select a device that can be connected. The user may directly identify and select a device that can be connected through the image 812 of the devices that can be connected included in the screen 810. The image 812 may include an icon indicating the electronic apparatus 100 and icons indicating the devices that can be connected with the electronic apparatus 100. Information related to the icons corresponding to the devices that can be connected may be included in the response information transmitted in the operations S615-1 and S615-2 in FIG. 6. The user can easily select which device is to be connected intuitively through the icons.

Also, the image 812 may include the connection list and information indicating by what communication method a connectable device can be connected (e.g., BLE).

Figure 9:
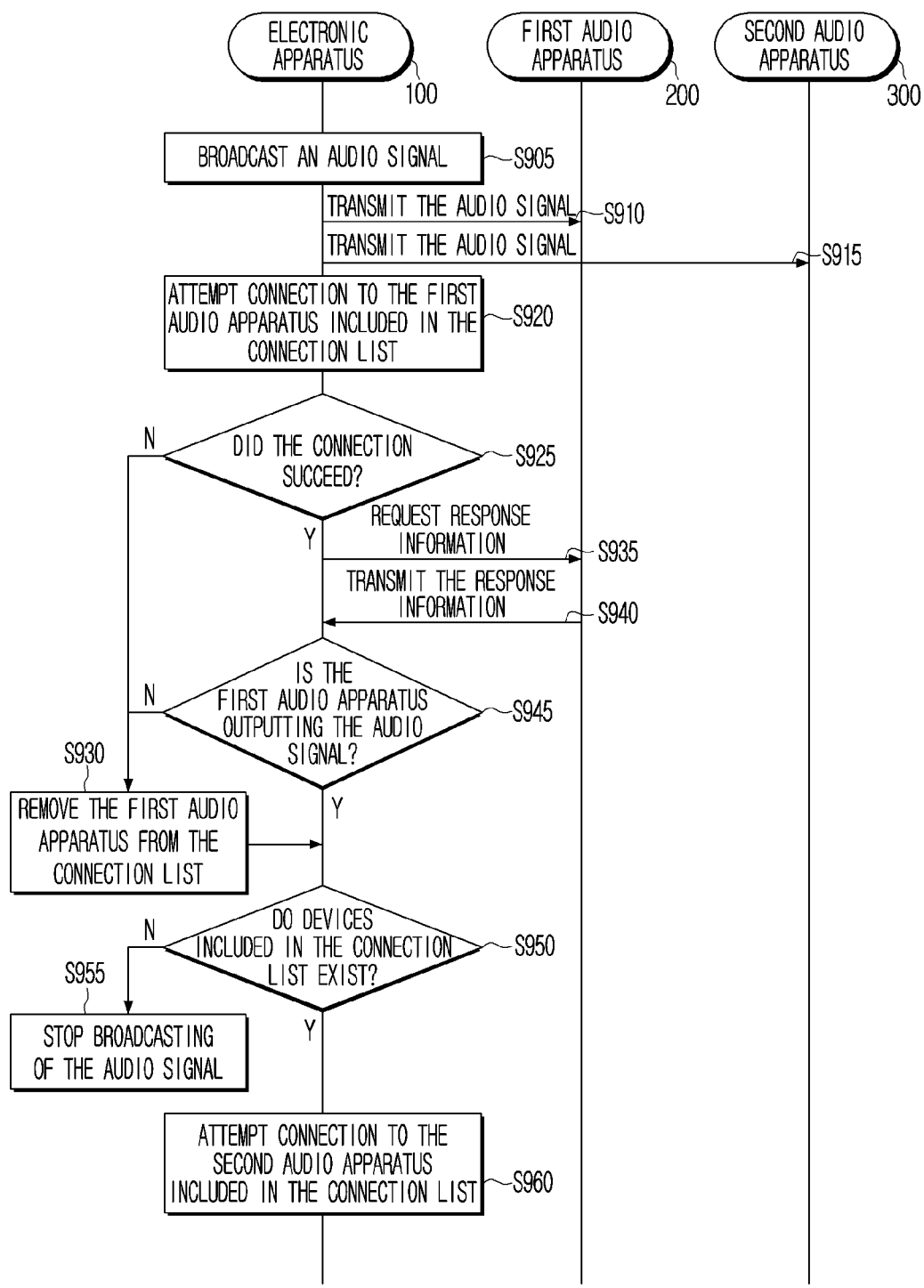
FIG. 9 is a flow chart for illustrating an operation of changing a device to be connected from a first audio apparatus to a second apparatus according to various example embodiments.

FIG. 9 is a flow chart for illustrating an operation of updating a connection list according to various embodiments.

Referring to FIG. 9, the electronic apparatus 100 may store a connection list in advance. The connection list may indicate devices which were already connected once and with which an audio signal was synchronized. The electronic apparatus 100 may identify whether an audio signal is output from at least one audio apparatus. Then, the electronic apparatus 100 may amend the connection list based on the identification result.

The electronic apparatus 100 may broadcast an audio signal in operation S905. Then, the electronic apparatus 100 may transmit the audio signal to the first audio apparatus 200 in operation S910. Also, the electronic apparatus 100 may transmit the audio signal to the second audio apparatus 300 in operation S915.

The electronic apparatus 100 may attempt connection to the first audio apparatus 200 included in the connection list in operation S920. If connection with the first audio apparatus 200 does not succeed in operation S925-N, the electronic apparatus 100 may remove the first audio apparatus 200 from the connection list in operation S930.

If connection with the first audio apparatus 200 succeeds in operation S925-Y, the electronic apparatus 100 may request response information to the first audio apparatus 200 in operation S935. The request of response information may include at least one of sync data for synchronizing with the audio signal or output state information including the audio output state.

The first audio apparatus 200 may receive the request of response information from the electronic apparatus 100. The first audio apparatus 200 may output the audio signal based on the sync data included in the response information. The sync data may be used for a synchronizing operation. Also, the first audio apparatus 200 may generate (or acquire) output state information by determining whether the audio signal is output. The first audio apparatus 200 may generate (or acquire) output state information including a first value indicating that the audio signal is being output normally or a second value indicating that the audio signal is not being output normally. The first audio apparatus 200 may generate response information including output state information, and transmit the generated response information to the electronic apparatus 100 in operation S940.

The electronic apparatus 100 may receive the response information from the first audio apparatus 200. The electronic apparatus 100 may identify whether the first audio apparatus 200 is outputting the audio signal based on the response information in operation S945.

If the first audio apparatus 200 is not outputting the audio signal in operation S945-N, the electronic apparatus 100 may remove the first audio apparatus 200 from the connection list in operation S930.

If the first audio apparatus 200 is outputting the audio signal in operation S945-Y, the electronic apparatus 100 may identify whether devices included in the connection list exist in operation S950, individually or collectively. If devices included in the connection list do not exist in operation S950-N, the electronic apparatus 100 may stop broadcasting of the audio signal in operation S955.

If devices included in the connection list exist in operation S950-Y, the electronic apparatus 100 may attempt connection to a device included in the connection list (the second audio apparatus 300) in operation S960. In the drawing, an operation of requesting response information to the second audio apparatus 300, etc. were omitted.

After the operation S960, the operations S925 to S955 may be repeatedly performed for the second audio apparatus 300.

The electronic apparatus 100 may attempt connection to the second audio apparatus 300 included in the connection list in operation S960. If connection with the second audio apparatus 300 does not succeed, the electronic apparatus 100 may remove the second audio apparatus 300 from the connection list.

If connection with the second audio apparatus 300 succeeds, the electronic apparatus 100 may request response information to the second audio apparatus 300. The request of response information may include at least one of sync data for synchronizing with the audio signal or output state information including the audio output state.

The second audio apparatus 300 may receive the request of response information from the electronic apparatus 100. The second audio apparatus 300 may output the audio signal based on the sync data included in the response information. The sync data may be used for a synchronizing operation. Also, the second audio apparatus 300 may generate (or acquire) output state information by determining whether the audio signal is output. The second audio apparatus 300 may generate (or acquire) output state information including a first value indicating that the audio signal is being output normally or a second value indicating that the audio signal is not being output normally. The second audio apparatus 300 may generate response information including output state information, and transmit the generated response information to the electronic apparatus 100.

The electronic apparatus 100 may receive the response information from the second audio apparatus 300. The electronic apparatus 100 may identify whether the second audio apparatus 300 is outputting the audio signal based on the response information.

If the second audio apparatus 300 is not outputting the audio signal, the electronic apparatus 100 may remove the second audio apparatus 300 from the connection list.

If the second audio apparatus 300 is outputting the audio signal, the electronic apparatus 100 may identify whether devices included in the connection list exist. If devices included in the connection list do not exist, the electronic apparatus 100 may stop broadcasting of the audio signal.

The electronic apparatus 100 may update the connection list by requesting response information for all devices included in the connection list.

Figure 10:
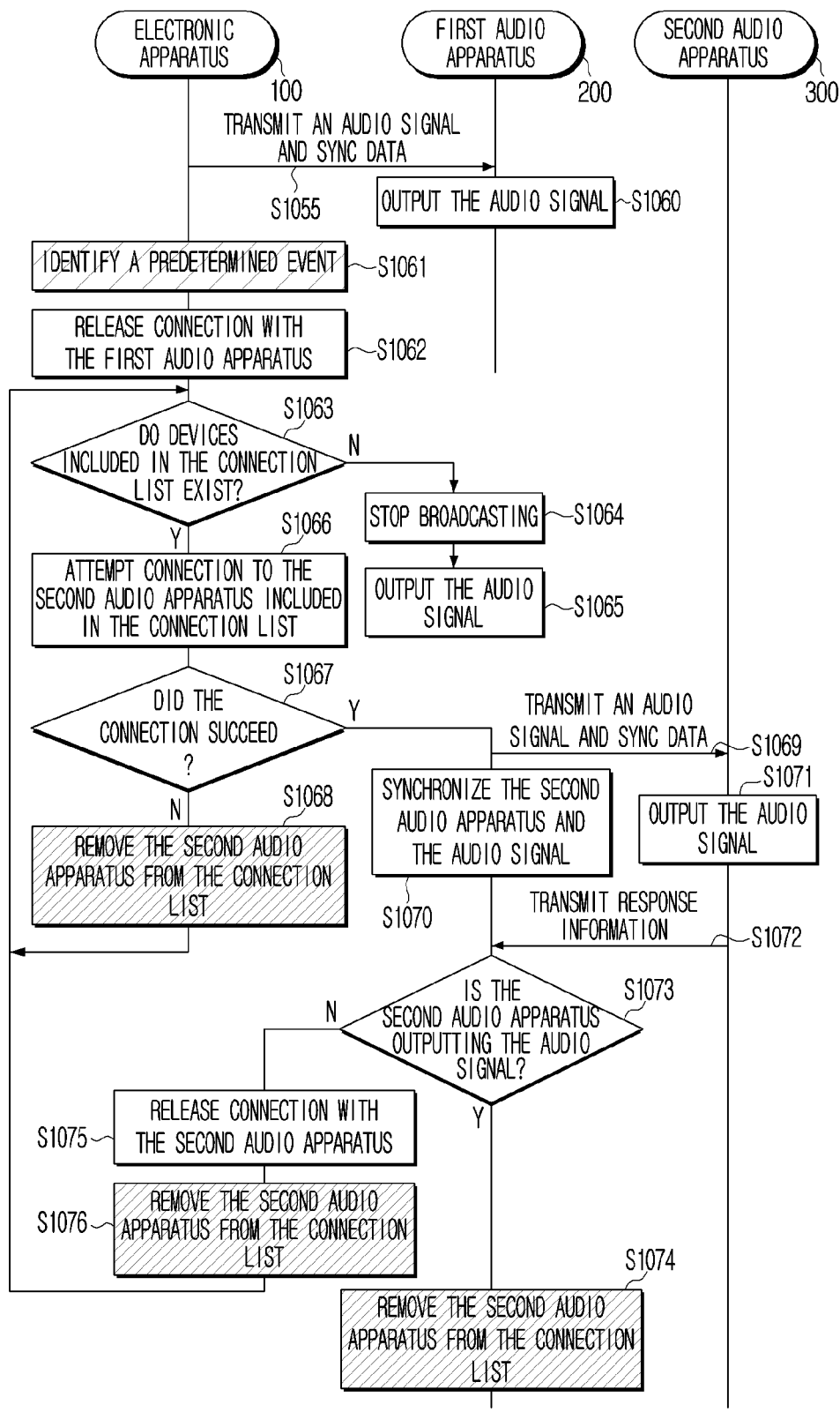
FIG. 10 is a flow chart for illustrating an operation of attempting connection to a second audio apparatus according to various example embodiments.

FIG. 10 is a flow chart for illustrating an operation of attempting connection to the second audio apparatus 300 according to various embodiments.

The operations S1055 and S1060 in FIG. 10 may correspond to the operations S655 and S660 in FIG. 6. Also, before the operation S1055, the operations S605 to S650 in FIG. 6 may be performed. The components and the overlapping descriptions in the drawing will be omitted.

After the first audio apparatus 200 outputs an audio signal, the electronic apparatus 100 may identify a predetermined event in operation S1061. The predetermined event may include at least one of an event wherein reception of audio from the first audio apparatus 200 is stopped, an event wherein connection with the first audio apparatus 200 is released, or an event wherein it is identified that the first audio apparatus 200 is not in a state of outputting an audio signal.

An event wherein reception of audio from the first audio apparatus 200 is stopped may indicate an event wherein a signal indicating that an audio signal is not received anymore from the first audio apparatus 200 or a remote control apparatus connected with the first audio apparatus 200 is transmitted. Also, an event wherein reception of audio from the first audio apparatus 200 is stopped may be an event wherein response information corresponding to reception of audio from the first audio apparatus 200 is not transmitted.

Meanwhile, an event wherein it is identified that the first audio apparatus 200 is not in a state of outputting an audio signal may be an event wherein a value indicating that an audio signal is not output is included in output state information received from the first audio apparatus 200.

Also, an event wherein connection with the first audio apparatus 200 is released may be an event wherein the first audio apparatus 200 gets to become far away from the electronic apparatus 100, and a communication signal is not searched. Further, an event wherein connection with the first audio apparatus 200 is released may be an event wherein the power of the first audio apparatus 200 is turned off, and the first audio apparatus 200 is not connected with the electronic apparatus 100 anymore.

After the predetermined event is identified, the electronic apparatus 100 may release connection with the first audio apparatus 200 in operation S1062. Then, the electronic apparatus 100 may identify whether devices included in the connection list exist in operation S1063. Here, the electronic apparatus 100 may identify (or search) another device which is not the first audio apparatus 200 related to the predetermined event.

If devices included in the connection list do not exist in operation S1063-N, the electronic apparatus 100 may stop broadcasting in operation S1064. Then, the electronic apparatus 100 may output an audio signal through the built-in speaker 170 of the electronic apparatus 100 in operation S1065.

If devices included in the connection list exist in operation S1063-Y, the electronic apparatus 100 may attempt connection to one device among the devices included in the connection list in operation S1066. If the predetermined event is an event wherein a user input requesting connection to a specific device is received, the electronic apparatus 100 may attempt connection to the specific device selected by the user. It is assumed that connection with the first audio apparatus 200 is released, and the device that the electronic apparatus 100 attempts to connect newly is the second audio apparatus 300.

The electronic apparatus 100 may determine whether connection with the device that it attempted to connect (the second audio apparatus 300) succeeded in operation S1067.

In case connection did not succeed in operation S1067-N, the electronic apparatus 100 may remove the second audio apparatus 300 from the connection list in operation S1068. If connection does not succeed even though the second audio apparatus 300 is included in the connection list, the electronic apparatus 100 may determine that there is substantially a low possibility that the second audio apparatus 300 may be connected with the electronic apparatus 100. Accordingly, the electronic apparatus 100 may remove the second audio apparatus 300 from the connection list. After removing the second audio apparatus 300 from the connection list, the electronic apparatus 100 may repeat the operations S1063 to S1067.

If connection succeeds in operation S1067-Y, the electronic apparatus 100 may transmit an audio signal and sync data to the second audio apparatus 300 in operation S1069. Then, the electronic apparatus 100 may synchronize the second audio apparatus 300 and the audio signal in operation S1070.

The second audio apparatus 300 may receive the audio signal and the sync data from the electronic apparatus 100. The second audio apparatus 300 may output the audio signal based on the sync data in operation S1071. Then, the second audio apparatus 300 may transmit response information related to the output of the audio signal to the electronic apparatus 100 in operation S1072. The response information may include the output state of the audio signal. The output state of the audio signal may be information indicating whether the audio signal is being output normally.

The electronic apparatus 100 may receive the response information including the output state of the audio signal from the second audio apparatus 300. The electronic apparatus 100 may identify whether the second audio apparatus 300 is outputting the audio signal based on the output state of the audio signal included in the response information in operation S1073.

If it is identified that the second audio apparatus 300 is outputting the audio signal in operation S1073-Y, the electronic apparatus 100 may remove the second audio apparatus 300 from the connection list in operation S1074.

If it is identified that the second audio apparatus 300 is not outputting the audio signal in operation S1073-N, the electronic apparatus 100 may release connection with the second audio apparatus 300 in operation S1075. Then, the electronic apparatus 100 may remove the second audio apparatus 300 from the connection list in operation S1076. In case the second audio apparatus 300 is not substantially outputting the audio signal even though connection with the second audio apparatus 300 succeeded, the electronic apparatus 100 may determine that there is a connection error, or connection was performed wrongly. Accordingly, the electronic apparatus 100 may remove the second audio apparatus 300 from the connection list such that connection is not performed again.

Figure 11:
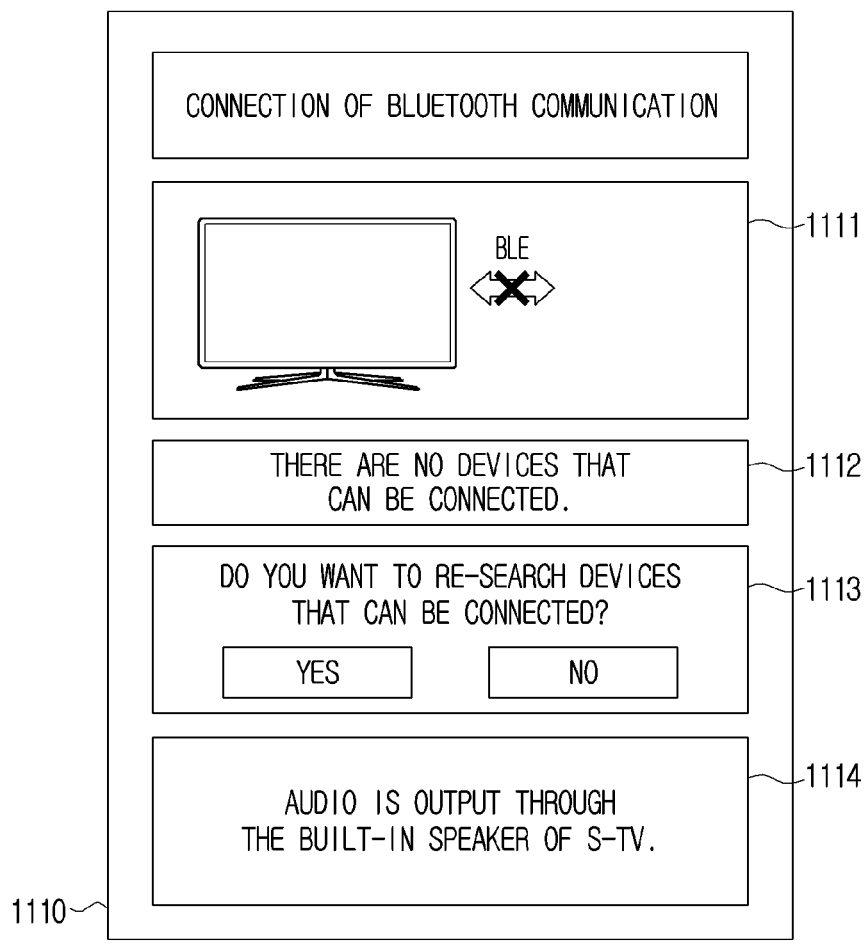
FIG. 11 is a diagram for illustrating an example operation of notifying that an audio signal is output from a built-in speaker.

FIG. 11 is a diagram for illustrating an operation of notifying that an audio signal is output from a built-in speaker.

Referring to FIG. 11, in case devices included in the connection list do not exist, the electronic apparatus 100 may display a screen 1110 guiding that an audio signal is output through the speaker 170. The screen 1110 may include information indicating that an audio signal will be output through the speaker 170 of the electronic apparatus 100 but not an external device (an audio apparatus) anymore.

The screen 1110 may include at least one of an image 1111 indicating that the electronic apparatus 100 is not connected with any external apparatus, text information 1112 indicating that devices are not included in the connection list, information 1113 requesting an instruction for re-search of devices that can be connected, or text information 1114 indicating that an audio signal is output through the built-in speaker.

If an instruction for re-search of devices that can be connected is received, the electronic apparatus 100 may perform a broadcasting operation again regardless of the generating and changing operations of the previous connection list. For example, the electronic apparatus 100 may repeat the operations S605 to S630 in FIG. 6.

Figure 12:
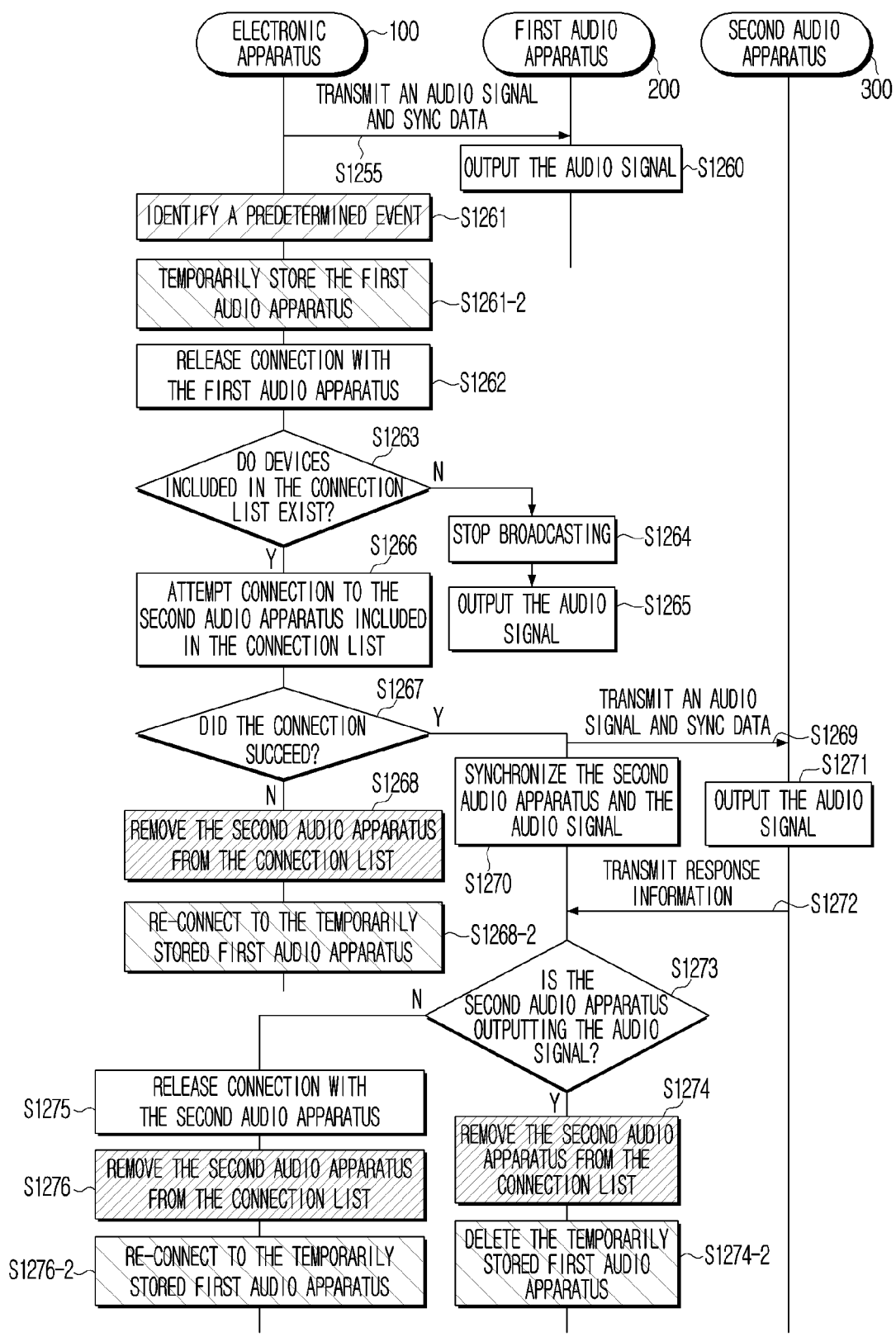
FIG. 12 is a flow chart for illustrating an operation of re-connecting with a first audio apparatus in case normal connection is not established with a second audio apparatus according to various example embodiments.

FIG. 12 is a flow chart for illustrating an operation of re-connecting with the first audio apparatus 200 in case normal connection is not established with the second audio apparatus 300 according to various embodiments.

The operations S1255, S1260, S1261, S1262, S1263, S1264, S1265, S1266, S1267, S1268, S1269, S1270, S1271, S1272, S1273, S1274, S1275, and S1276 in FIG. 12 may correspond to the operations S1055, S1060, S1061, S1062, S1063, S1064, S1065, S1066, S1067, S1068, S1069, S1070, S1071, S1072, S1073, S1074, S1075, and S1076 in FIG. 10. Accordingly, overlapping explanation will be omitted.

If a predetermined event is identified, the electronic apparatus 100 may temporarily store the first audio apparatus 200 in operation S1261-2. The operation of temporarily storing the first audio apparatus 200 may indicate temporarily storing connection information necessary for connection with the first audio apparatus 200. As the first audio apparatus 200 has already been removed from the connection list, the electronic apparatus 100 may store the connection information of the first audio apparatus 200 in a temporary memory, etc. for preparing for re-connection with the first audio apparatus 200.

If connection between the electronic apparatus 100 and the second audio apparatus 300 does not succeed even though the second audio apparatus 300 exists in the connection list in operation S1267-N, the electronic apparatus 100 may remove the second audio apparatus 300 from the connection list in operation S1268. Then, the electronic apparatus 100 may re-connect to the temporarily stored first audio apparatus 200 in operation S1268-2. Even if the predetermined event was performed, if connection with the second audio apparatus 300 which is a new device does not succeed, the electronic apparatus 100 may automatically re-connect to the first audio apparatus 200 which is the previously connected device. This is because it is easy for the user to identify a problem if an audio signal is continuously provided from the previously connected device. In case an audio signal is not provided from both of the first audio apparatus 200 and the second audio apparatus 300, it may be difficult for the user to intuitively figure out in which device a problem occurred. The user may not be provided with an audio signal from the second audio apparatus 300. However, the user may be provided with an audio signal from the first audio apparatus 200.

Also, if the second audio apparatus 300 exists in the connection list, and connection between the electronic apparatus 100 and the second audio apparatus 300 succeeded, and it is identified that the second audio apparatus 300 is outputting an audio signal in operation S1273-Y, the electronic apparatus 100 may remove the second audio apparatus 300 from the connection list in operation S1274. Then, the electronic apparatus 100 may delete the temporarily stored first audio apparatus 200. The electronic apparatus 100 may delete the connection information of the temporarily stored first audio apparatus 200 in operation S1274-2. This is because the electronic apparatus 100 may determine that connection with the first audio apparatus 200 is not needed anymore, as connection with the second audio apparatus 300 was performed normally.

Also, if the second audio apparatus 300 exists in the connection list, and connection between the electronic apparatus 100 and the second audio apparatus 300 succeeded, and it is identified that the second audio apparatus 300 is not outputting an audio signal in operation S1273-N, the electronic apparatus 100 may release the connection with the second audio apparatus 300 in operation S1275. Then, the electronic apparatus 100 may remove the second audio apparatus 300 from the connection list in operation S1276. Then, the electronic apparatus 100 may re-connect to the temporarily stored first audio apparatus 200 in operation S1276-2. Even if the predetermined event was performed, if an audio signal is not output normally from the second audio apparatus 300 which is a new device, the electronic apparatus 100 may automatically re-connect to the first audio apparatus 200 which is the previously connected device. This is because it is easy for the user to identify a problem if an audio signal is continuously provided from the previously connected device.

Figure 13:
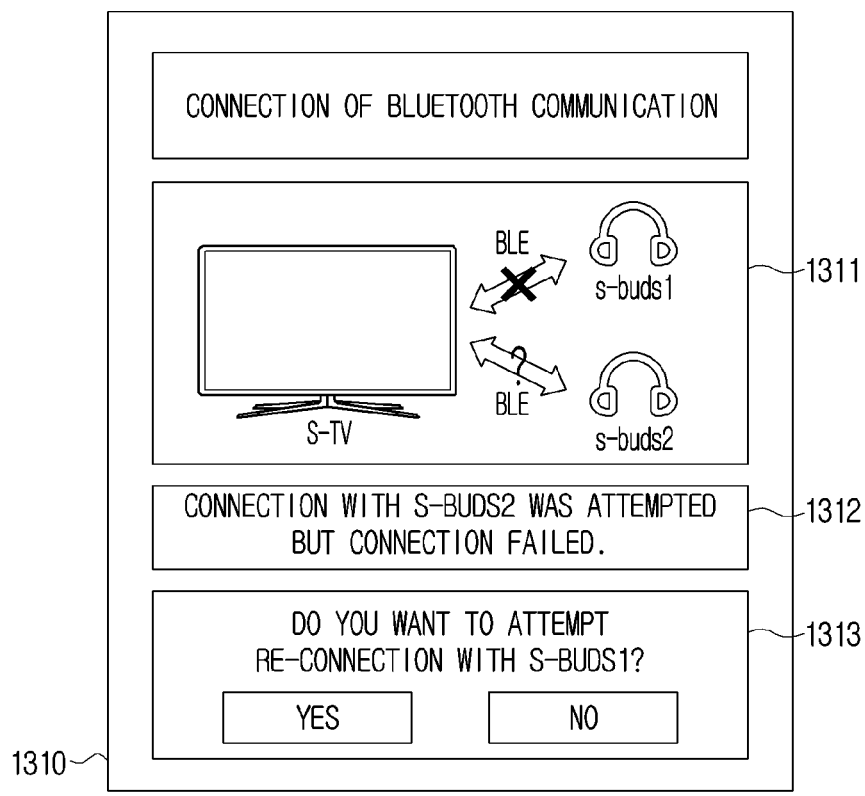
FIG. 13 is a diagram for illustrating an example operation of displaying a guide UI for re-connecting with a first audio apparatus.

FIG. 13 is a diagram for illustrating an operation of displaying a guide UI for re-connecting with the first audio apparatus 200.

Referring to FIG. 13, if it is identified that connection with a new device failed, or an audio signal is not output normally after connection, the electronic apparatus 100 may provide a screen 1310 for attempting re-connection with the previously connected device.

The screen 1310 may include at least one of an image 1311 indicating the current connection state, text information 1312 indicating that attempt to connect with a new device for connection failed, or information 1313 requesting to attempt re-connection with the previously connected device.

The image 1311 may include at least one of an icon 'X' indicating that the connection with the previously connected device s-buds1 was released, an icon '?' indicating that normal connection with the new device for connection s-buds2 was not performed, or text information (BLE) indicating communication methods with each device.

If a user input requesting to attempt re-connection with the previously connected device is received through the information 1313, the electronic apparatus 100 may attempt re-connection with the previously connected device s-buds1.

Figure 14:
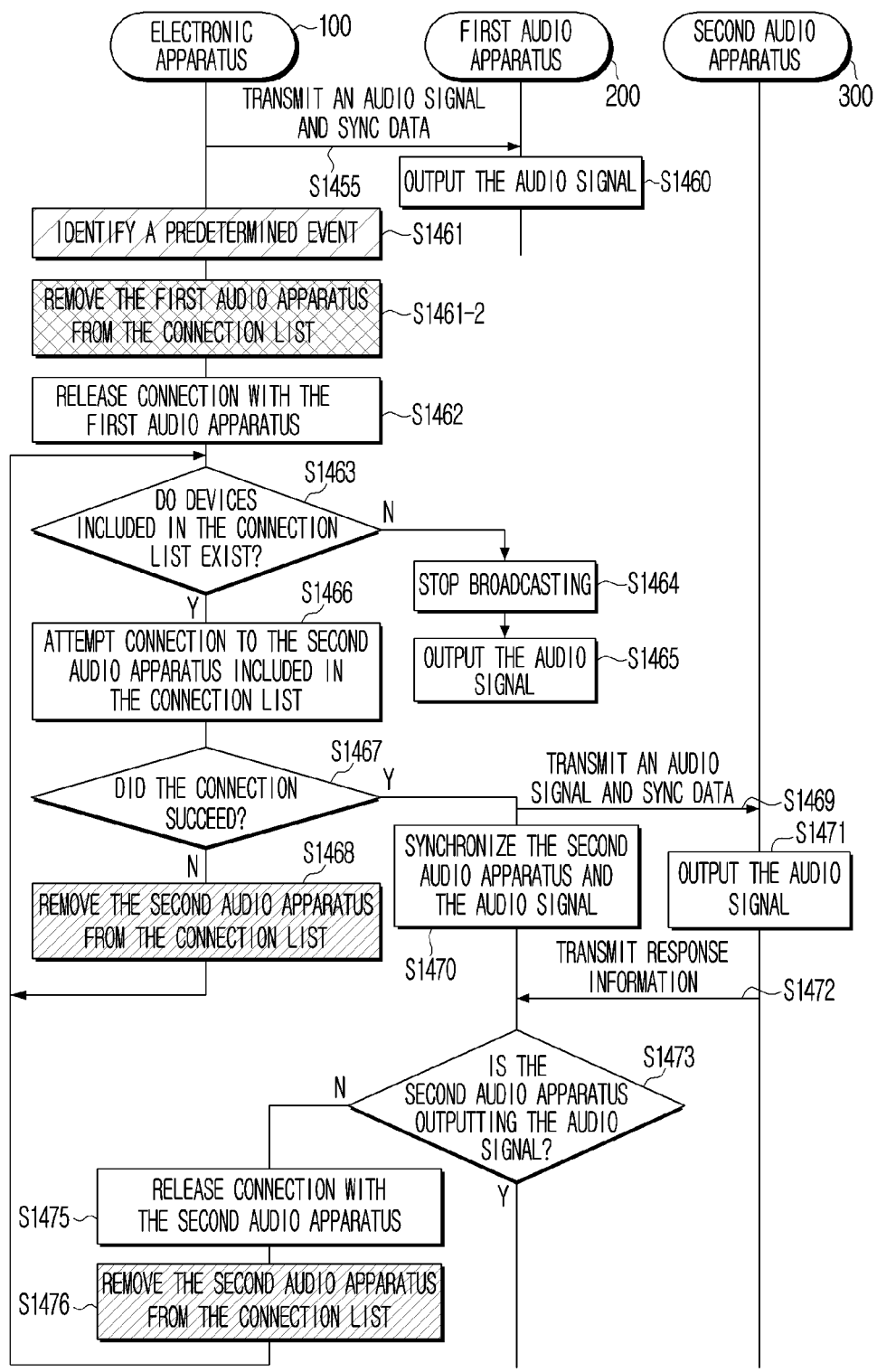
FIG. 14 is a flow chart for illustrating an operation of attempting connection to a second audio apparatus according to various example embodiments.

FIG. 14 is a flow chart for illustrating an operation of attempting connection to the second audio apparatus 300 according to various embodiments.

The operations S1455, S1460, S1461, S1462, S1463, S1464, S1465, S1466, S1467, S1468, S1469, S1470, S1471, S1472, S1473, S1475, and S1476 in FIG. 14 may correspond to the operations S1055, S1060, S1061, S1062, S1063, S1064, S1065, S1066, S1067, S1068, S1069, S1070, S1071, S1072, S1073, S1075, and S1076 in FIG. 10. Accordingly, overlapping explanation will be omitted.

After a predetermined event is identified, the electronic apparatus 100 may remove the first audio apparatus 200 from the connection list in operation S1461-2. As it is determined that the electronic apparatus 100 may not be connected with the first audio apparatus 200 anymore or there is no need for connection, the electronic apparatus 100 may remove the first audio apparatus 200 from the connection list. Afterwards, the electronic apparatus 100 may perform the operations S1462 to S1476.

Also, if it is identified that an audio signal is being output from the second audio apparatus 300 in operation S1473-Y, the electronic apparatus 100 may maintain the second audio apparatus 300 in the connection list. Meanwhile, the operation S1074 in FIG. 10 may not be performed in the embodiment of FIG. 14.

Figure 15:
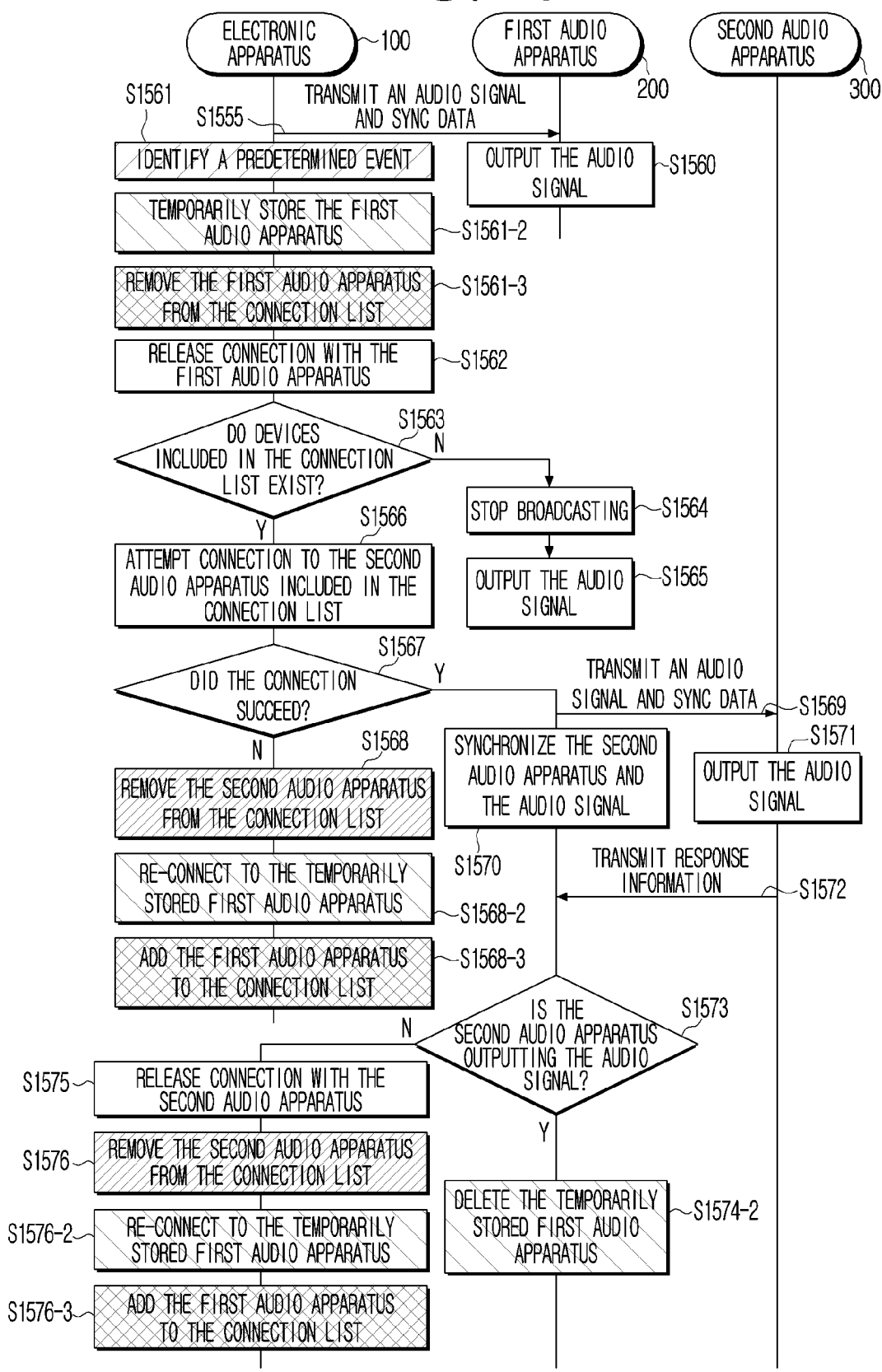
FIG. 15 is a flow chart for illustrating an operation of re-connecting with a first audio apparatus in case normal connection is not established with a second audio apparatus according to various example embodiments.

FIG. 15 is a flow chart for illustrating an operation of re-connecting with the first audio apparatus 200 in case normal connection is not established with the second audio apparatus 300 according to various embodiments.

The operations S1555, S1560, S1561, S1561-2, S1562, S1563, S1564, S1565, S1566, S1567, S1568, S1569, S1570, S1571, S1572, S1573, S1574-2, S1575, S1576, and S1576-2 in FIG. 15 may correspond to the operations S1255, S1260, S1261, S1261-2, S1262, S1263, S1264, S1265, S1266, S1267, S1268, S1269, S1270, S1271, S1272, S1273, S1274-2, S1275, S1276, and S1276-2 in FIG. 12. Accordingly, overlapping explanation will be omitted.

After a predetermined event is identified and the first audio apparatus 200 is temporarily stored, the electronic apparatus 100 may remove the first audio apparatus 200 from the connection list in operation S1561-3. As it is determined that the electronic apparatus 100 may not be connected with the first audio apparatus 200 anymore or there is no need for connection, the electronic apparatus 100 may remove the first audio apparatus 200 from the connection list.

Also, if connection between the electronic apparatus 100 and the second audio apparatus 300 does not succeed even though the second audio apparatus 300 exists in the connection list, the electronic apparatus 100 may re-connect to the temporarily stored first audio apparatus 200 in operation S1568-2. Then, the electronic apparatus 100 may add the first audio apparatus 200 to the connection list in operation S1568-3. As the electronic apparatus 100 was re-connected with the first audio apparatus 200 even though the electronic apparatus 100 removed the first audio apparatus 200 in the operation S1561-3, the electronic apparatus 100 may add the first audio apparatus 200 to the connection list.

In addition, if it is identified that the second audio apparatus 300 exists in the connection list, and connection between the electronic apparatus 100 and the second audio apparatus 300 succeeded, and it is identified that the second audio apparatus 300 is outputting an audio signal in operation S1573-Y, the electronic apparatus 100 may maintain the second audio apparatus 300 in the connection list. The operation S1274 in FIG. 12 may not be performed in the embodiment of FIG. 15.

Further, if it is identified that the second audio apparatus 300 exists in the connection list, and connection between the electronic apparatus 100 and the second audio apparatus 300 succeeded, and it is identified that the second audio apparatus 300 is not outputting an audio signal in operation S1573-N, the electronic apparatus 100 may re-connect to the temporarily stored first audio apparatus 200 in operation S1576-2. Then, the electronic apparatus 100 may add the first audio apparatus 200 to the connection list in operation S1576-3. As the electronic apparatus 100 was re-connected with the first audio apparatus 200 even though the electronic apparatus 100 removed the first audio apparatus 200 in the operation S1561-3, the electronic apparatus 100 may add the first audio apparatus 200 to the connection list.

FIG. 16 is a flow chart for illustrating an operation related to a mute function according to various embodiments.

Referring to FIG. 16, the electronic apparatus 100 may broadcast an audio signal in operation S1605. After broadcasting the audio signal, the electronic apparatus 100 may identify a predetermined event in operation S1610.

If the predetermined event is identified, the electronic apparatus 100 may identify whether devices included in the connection list exist in operation S1615. If devices are included in the connection list in operation S1615-Y, the electronic apparatus 100 may repeat the operations S1610 and S1615.

If devices are not included in the connection list in operation S1615-N, the electronic apparatus 100 may stop broadcasting in operation S1620. The electronic apparatus 100 may display a guide screen related to output of an audio signal in operation S1625. The guide screen may be a guide screen for notifying to the user that an audio signal is output through the built-in speaker 170 of the electronic apparatus 100, as no external device to which an audio signal provided from the electronic apparatus 100 will be provided exists. The guide screen may include text information inquiring about whether to perform a mute function such that an audio signal is not output through the built-in speaker 170 of the electronic apparatus 100.

The electronic apparatus 100 may identify whether a user input for muting is received through the guide screen in operation S1630. If a user input for muting is received through the guide screen in operation S1630-Y, the electronic apparatus 100 may perform the mute function in operation S1635. The purpose for the user to output an audio signal through an external device (e.g., a headset) may be for not outputting a sound through the built-in speaker in a quiet place. However, an operation of immediately outputting an audio signal through the built-in speaker 170 because an external device that can be connected does not exist in the list may not suit the user intent.

Accordingly, the electronic apparatus 100 may provide a guide screen requesting a mute function to the user.

If a user input for muting is not received through the guide screen in operation S1630-N, the electronic apparatus 100 may output an audio signal through the built-in speaker 170 in operation S1640. If a user input for muting is not received through the guide screen during a threshold time, the electronic apparatus 100 may automatically output an audio signal through the built-in speaker 170.

FIG. 17 is a diagram for illustrating an operation related to a mute function.

Referring to FIG. 17, if a broadcasting operation is stopped as devices are not included in the connection list, the electronic apparatus 100 may display a guide screen 1710.

The guide screen 1710 may include at least one of an image 1711 indicating that the electronic apparatus 100 is not connected with any external apparatus, text information 1712 indicating that devices are not included in the connection list, text information 1713 indicating that an audio signal is output through the built-in speaker, or information 1714 requesting the mute function.

If a user input for performing the mute function is received through the information 1714, the electronic apparatus 100 may perform control such that an audio signal is not output through the built-in speaker 170 by immediately performing the mute function.

In case devices are not included in the connection list, in the embodiment of FIG. 16, an audio signal may be basically output through the built-in speaker 170, and the mute function may be performed limited to a case wherein a separate user input was received.

In case devices are not included in the connection list, in the embodiment of FIG. 18, the mute function may be basically performed, and an audio signal may be output through the built-in speaker 170 limited to a case wherein a separate user input was received.

FIG. 18 is a flow chart for illustrating an operation of outputting an audio signal through a built-in speaker.

The operations S1805, S1810, S1815, S1820, and S1825 in FIG. 18 may correspond to the operations S1605, S1610, S1615, S1616, and S1625 in FIG. 16. Accordingly, overlapping explanation will be omitted.

Unlike in the embodiment of FIG. 16, the guide screen in FIG. 18 may include information confirming whether to output an audio signal through the built-in speaker 170 from the user. Explanation related to the guide screen will be described in FIG. 19.

The electronic apparatus 100 may identify whether a user input for outputting an audio signal at the built-in speaker 170 was received through the guide screen in operation S1830. If a user input for outputting an audio signal at the built-in speaker 170 is received in operation S1830-Y, the electronic apparatus 100 may output an audio signal at the built-in speaker 170 in operation S1835.

If a user input for outputting an audio signal at the built-in speaker 170 is not received in operation S1830-N, the electronic apparatus 100 may perform the mute function. An operation of immediately outputting an audio signal through the built-in speaker 170 because external devices that can be connected do not exist in the list may not suit the user intent.

Accordingly, the electronic apparatus 100 may automatically perform the mute function in operation S1840.

FIG. 19 is a diagram for illustrating an operation of outputting an audio signal through a built-in speaker.

Referring to FIG. 19, if a broadcasting operation is stopped as devices are not included in the connection list, the electronic apparatus 100 may display a guide screen 1910.

The guide screen 1910 may include at least one of an image 1911 indicating that the electronic apparatus 100 is not connected with any external apparatus, text information 1912 indicating that devices are not included in the connection list, text information 1913 indicating that an audio signal is not output, or information 1914 requesting to output an audio signal through the built-in speaker.

If a user input for outputting an audio signal through the built-in speaker is received through the information 1914, the electronic apparatus 100 may perform control such that an audio signal is output through the built-in speaker 170.

Each embodiment herein may be use in combination with any other embodiment(s) described herein.

Figure 20:
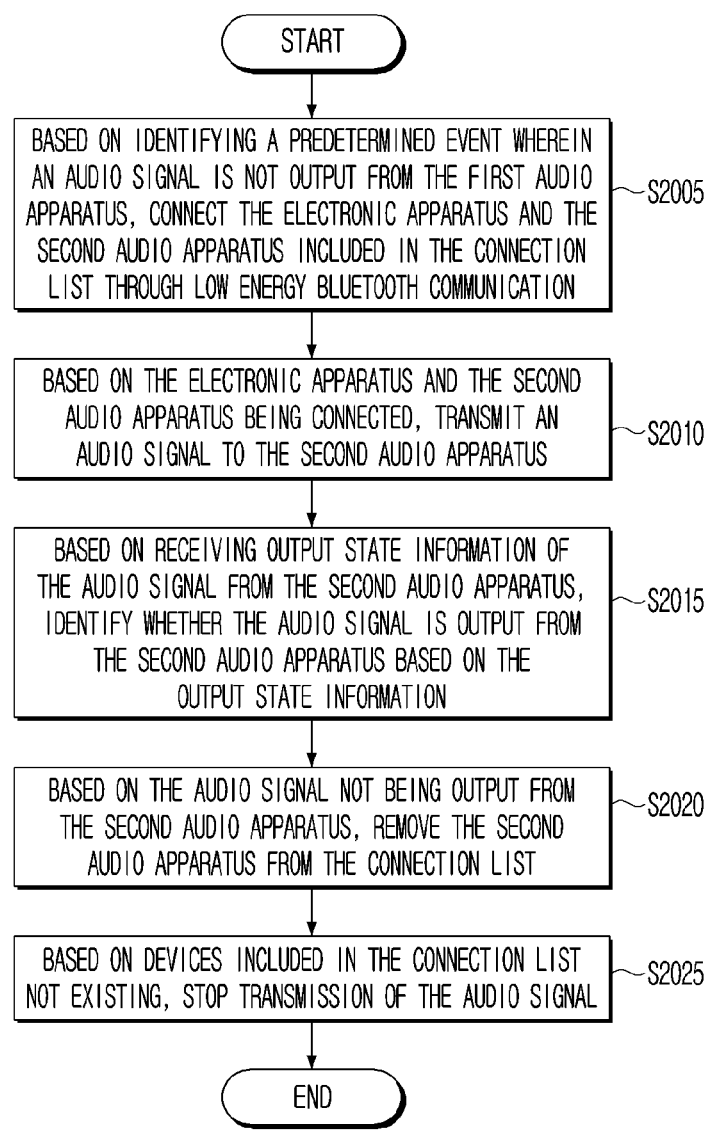
FIG. 20 is a flow chart for illustrating a controlling method of an electronic apparatus according to various example embodiments.

FIG. 20 is a flow chart for illustrating a controlling method of the electronic apparatus 100 according to various embodiments.

Referring to FIG. 20, a controlling method of an electronic apparatus configured to store a connection list including devices that can be connected and broadcast an audio signal to a first audio apparatus and a second audio apparatus included in the connection list includes the steps of, based on identifying a predetermined event wherein the audio signal is not output from the first audio apparatus, connecting the electronic apparatus and the second audio apparatus included in the connection list through low energy Bluetooth communication (S2005), based on the electronic apparatus and the second audio apparatus being connected, transmitting a signal requesting output state information to the second audio apparatus (S2010), based on receiving the output state information of the audio signal from the second audio apparatus, identifying whether the audio signal is output from the second audio apparatus based on the output state information (S2015), based on the audio signal not being output from the second audio apparatus, removing the second audio apparatus from the connection list (S2020), and based on devices included in the connection list not existing, stopping transmission of the audio signal (S2025).

Meanwhile, the controlling method may further include the steps of, based on receiving a user input for connecting with the first audio apparatus among the at least one apparatus included in the connection list, connecting the electronic apparatus and the first audio apparatus through low energy Bluetooth communication, and based on the electronic apparatus and the first audio apparatus being connected, transmitting an audio signal to the first audio apparatus, and removing the first audio apparatus from the connection list.

Meanwhile, the predetermined event may include at least one of reception of a user input for releasing connection with the first audio apparatus, identification of the first audio apparatus not outputting the audio signal, or non-reception of a response signal related to the connection from the first audio apparatus.

Meanwhile, the controlling method may further include the step of, based on the electronic apparatus and the second audio apparatus not being connected, removing the second audio apparatus from the connection list, and identifying the devices included in the connection list.

Meanwhile, the controlling method may further include the step of, based on the audio signal being output from the second audio apparatus, removing the second audio apparatus from the connection list.

Meanwhile, the controlling method may further include the step of, based on a predetermined event being identified, storing connection information corresponding to the first audio apparatus.

Meanwhile, the controlling method may further include the step of, based on the electronic apparatus and the second audio apparatus not being connected or the audio signal not being output from the second audio apparatus, removing the second audio apparatus from the connection list, and re-connecting the electronic apparatus and the first audio apparatus through low energy Bluetooth communication based on the connection information corresponding to the first audio apparatus.

Meanwhile, the controlling method may further include the step of, based on the audio signal being output from the second audio apparatus, removing the second audio apparatus from the connection list, and deleting the connection information corresponding to the first audio apparatus.

Meanwhile, the controlling method may further include the steps of, based on the devices included in the connection list not existing, displaying a guide screen corresponding to a mute function, and based on receiving a third user input for performing the mute function through the guide screen, performing the mute function. "Based on" as used herein covers based at least on.

Meanwhile, the guide screen may include text information indicating that the audio signal was output through the electronic apparatus.

Meanwhile, the controlling method of an electronic apparatus as in FIG. 20 may be executed in the electronic apparatus 100 having the configuration as in FIG. 2 or FIG. 3, and it may also be executed on electronic apparatuses having other configurations.

Meanwhile, the methods according to the aforementioned various embodiments of the disclosure may be implemented in forms of applications that can be installed on conventional electronic apparatuses.

Also, the methods according to the aforementioned various embodiments of the disclosure may be implemented just with software upgrade, or hardware upgrade of conventional electronic apparatuses.

In addition, the aforementioned various embodiments of the disclosure may be performed through an embedded server provided on an electronic apparatus, or an external server of at least one of an electronic apparatus or a display apparatus.

Meanwhile, according to an embodiment, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment, the methods according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or can be distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned various embodiments may consist of a singular object or a plurality of objects. Also, among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic apparatus comprising:
a memory configured to store a connection list including devices that can be connected with the electronic apparatus;
a communication interface, comprising circuitry, configured to broadcast an audio signal to a first audio apparatus and a second audio apparatus included in the connection list; and
at least one processor configured to:
based on the audio signal not being output from the first audio apparatus, control the communication interface such that the electronic apparatus and the second audio apparatus included in the connection list are connected through at least low energy Bluetooth communication,
based on the electronic apparatus and the second audio apparatus being connected, control to transmit a signal requesting output state information to the second audio apparatus,
remove the second audio apparatus from the connection list based on the output state information corresponding to a non-output of the audio signal received from the second audio apparatus through the communication interface, and
based on devices included in the connection list not existing, control the communication interface to stop transmission of the audio signal.

2. The electronic apparatus of claim 1,
wherein the at least one processor is configured to:
based on receiving a user input for connecting with the first audio apparatus among the at least one apparatus included in the connection list, control the communication interface such that the electronic apparatus and the first audio apparatus are connected through at least low energy Bluetooth communication, and
based on the electronic apparatus and the first audio apparatus being connected, control to transmit an audio signal to the first audio apparatus, and remove the first audio apparatus from the connection list.

3. The electronic apparatus of claim 1,
wherein the non-output of the audio signal comprises:
at least one of: reception of a user input for releasing connection with the first audio apparatus, identification of the first audio apparatus not outputting the audio signal, or non-reception of a response signal related to the connection from the first audio apparatus.

4. The electronic apparatus of claim 1,
wherein the at least one processor is configured to:
based on the electronic apparatus and the second audio apparatus not being connected, remove the second audio apparatus from the connection list, and identify the devices included in the connection list.

5. The electronic apparatus of claim 1,
wherein the at least one processor is configured to:
based on the audio signal being output from the second audio apparatus, remove the second audio apparatus from the connection list.

6. The electronic apparatus of claim 1,
wherein the at least one processor is configured to:
based on a predetermined event being identified, store connection information corresponding to the first audio apparatus in the memory.

7. The electronic apparatus of claim 6,
wherein the at least one processor is configured to:
based on the electronic apparatus and the second audio apparatus not being connected and/or the audio signal not being output from the second audio apparatus, remove the second audio apparatus from the connection list, and control the communication interface such that the electronic apparatus and the first audio apparatus are re-connected through at least low energy Bluetooth communication based on the connection information corresponding to the first audio apparatus.

8. The electronic apparatus of claim 6,
wherein the at least one processor is configured to:
based on the audio signal being output from the second audio apparatus, remove the second audio apparatus from the connection list, and delete the connection information corresponding to the first audio apparatus.

9. The electronic apparatus of claim 1,
wherein the electronic apparatus further comprises:
a display, and
wherein the at least one processor is configured to:
based on devices included in the connection list not existing, control the display to display a guide screen corresponding to a mute function, and
based on receiving a third user input for performing the mute function through the guide screen, perform the mute function.

10. The electronic apparatus of claim 9,
wherein the guide screen comprises:
text information indicating that the audio signal was output through the electronic apparatus.

11. A controlling method of an electronic apparatus, wherein the electronic apparatus is configured to store a connection list including devices that can be connected and broadcast an audio signal to a first audio apparatus and a second audio apparatus included in the connection list, the method comprising:
based on the audio signal not being output from the first audio apparatus, connecting the electronic apparatus and the second audio apparatus included in the connection list through at least low energy Bluetooth communication;
based on the electronic apparatus and the second audio apparatus being connected, transmitting a signal requesting output state information to the second audio apparatus;
removing the second audio apparatus from the connection list based on the output state information corresponding to a non-output of the audio signal received from the second audio apparatus; and
based on devices included in the connection list not existing, stopping transmission of the audio signal, and outputting the audio signal.

12. The controlling method of claim 11,
wherein the controlling method further comprises:
based on receiving a user input for connecting with the first audio apparatus among the at least one apparatus included in the connection list, connecting the electronic apparatus and the first audio apparatus through at least low energy Bluetooth communication; and based on the electronic apparatus and the first audio apparatus being connected, transmitting an audio signal to the first audio apparatus, and removing the first audio apparatus from the connection list.

13. The controlling method of claim 11, wherein the non-output of the audio signal comprises:

at least one of: reception of a user input for releasing connection with the first audio apparatus, identification of the first audio apparatus not outputting the audio signal, or non-reception of a response signal related to the connection from the first audio apparatus.

14. The controlling method of claim 11, wherein the controlling method further comprises:

based on the electronic apparatus and the second audio apparatus not being connected, removing the second audio apparatus from the connection list, and identifying the devices included in the connection list.

15. The controlling method of claim 11, wherein the controlling method further comprises:

based on the audio signal being output from the second audio apparatus, removing the second audio apparatus from the connection list.

* * * * *